United States Patent
Cooper et al.

(10) Patent No.: US 6,901,209 B1
(45) Date of Patent: May 31, 2005

(54) PROGRAM VIEWING APPARATUS AND METHOD

(75) Inventors: J. Carl Cooper, Monte Sereno, CA (US); Steve Anderson, Cupertino, CA (US)

(73) Assignee: Pixel Instruments, Los Gatos, CA (US)

( * ) Notice: Subject to any disclaimer, the term of this patent is extended or adjusted under 35 U.S.C. 154(b) by 0 days.

(21) Appl. No.: 08/486,000

(22) Filed: Jun. 8, 1995

Related U.S. Application Data

(63) Continuation-in-part of application No. 08/322,069, filed on Oct. 12, 1994, now Pat. No. 5,920,842.

(51) Int. Cl.[7] .............................................. H04N 5/91
(52) U.S. Cl. ..................................................... 386/109
(58) Field of Search ........................ 381/29, 30, 33, 381/34, 35, 36, 37, 38, 39, 40; 348/384, 385, 7, 12, 13, 10, 467, 473, 714; 370/118, 73; 375/240, 253; 455/4.2, 5.1, 161.3, 186.1, 161.2, 166.2; 709/247; 725/134, 148; 386/83.1, 109.111–112, 33, 125–126, 415, 68, 21, 113; 369/14, 15, 60

(56) References Cited

U.S. PATENT DOCUMENTS

| | | | | | |
|---|---|---|---|---|---|
| 3,786,195 A | * | 1/1974 | Schiffman | ..................... | 381/34 |
| 4,320,486 A | * | 3/1982 | Cooley et al. | ................ | 369/14 |
| 4,435,832 A | * | 3/1984 | Asada et al. | ................... | 381/34 |
| 4,816,905 A | * | 3/1989 | Tweedy et al. | ............. | 725/114 |
| 4,864,620 A | * | 9/1989 | Bialick | ......................... | 381/34 |
| 4,908,866 A | * | 3/1990 | Goldwasser et al. | .......... | 381/44 |
| 5,020,104 A | * | 5/1991 | Ciulin | .......................... | 381/29 |
| 5,133,079 A | * | 7/1992 | Ballantyne et al. | ........... | 358/86 |
| 5,159,636 A | * | 10/1992 | Rogalski | ...................... | 381/29 |
| 5,241,428 A | * | 8/1993 | Goldwasser et al. | .......... | 360/32 |
| 5,287,420 A | * | 2/1994 | Barrett | ....................... | 348/384 |
| 5,303,326 A | * | 4/1994 | Dean et al. | ................... | 381/29 |
| 5,353,121 A | * | 10/1994 | Young et al. | ................. | 725/52 |
| 5,371,551 A | * | 12/1994 | Logan et al. | ............... | 348/571 |
| 5,406,626 A | * | 4/1995 | Ryan | ........................... | 380/49 |
| 5,483,506 A | * | 1/1996 | Yoshioka et al. | ............. | 381/34 |
| 5,523,796 A | * | 6/1996 | Marshall et al. | .............. | 725/41 |
| 5,524,051 A | * | 6/1996 | Ryan | ........................... | 381/34 |
| 5,555,463 A | * | 9/1996 | Staron | ........................ | 348/560 |
| 5,583,937 A | * | 12/1996 | Ullrich et al. | ................ | 725/41 |
| 5,590,195 A | * | 12/1996 | Ryan | ............................. | 380/9 |
| 5,710,601 A | * | 1/1998 | Marshall et al. | .............. | 725/41 |
| 5,790,198 A | * | 8/1998 | Roop et al. | ................... | 725/48 |
| 5,815,671 A | * | 9/1998 | Morrison | ..................... | 348/10 |
| 5,887,114 A | * | 3/1999 | Nakatani et al. | ............ | 348/497 |
| 5,956,629 A | * | 9/1999 | Morrison | ................. | 455/166.2 |

* cited by examiner

*Primary Examiner*—Dang Ton
(74) *Attorney, Agent, or Firm*—Lightbody & Lucas

(57) ABSTRACT

The present disclosure teaches a method and apparatus for allowing a user to select and view one or multiple programs at random whenever he desires and to suspend viewing in the middle of a program to accommodate an interruption and to continue viewing after the interruption without missing any of the program. In addition, previously stored programs may be viewed at accelerated or decelerated speed, or repeated or portions reviewed, to allow the user to review such in other than real time.

126 Claims, 19 Drawing Sheets

Figure 2  MPEG 2 Encoder Development System, Block Diagram

PRIOR ART

| PROGRAM DATA STREAM NUMBER | IDENTIFIER | PROGRAM STORAGE TIME 1 | STORAGE TIME 1 PRIORITY | STORE PERIOD | MOST/LEAST RECENT OVERWRITE | PROGRAM STORAGE TIME 2 | STORAGE TIME 2 PRIORITY | STORE PERIOD | MOST/LEAST RECENT OVERWRITE |
|---|---|---|---|---|---|---|---|---|---|
| 1 | | | | | | | | | |
| 2 | | | | | | | | | |
| 3 | | | | | | | | | |
| 4 | | | | | | | | | |

A B C D E F G H I J K L M N O P Q R S T U V W X Y Z  HOUR DAY WEEK MONTH M-F
0 1 2 3 4 5 6 7 8 9 * # - : M T W Th F Sa Su AM PM  DAILY WEEKLY S-S MOST  EXIT
                                                                     LEAST

Fig. 4

| PROGRAM DATA STREAM NUMBER | IDENTIFIER | PROGRAM STORAGE TIME 1 | STORAGE TIME 1 PRIORITY | STORE PERIOD | MOST/LEAST RECENT OVERWRITE | PROGRAM STORAGE TIME 2 | STORAGE TIME 2 PRIORITY | STORE PERIOD | MOST/LEAST RECENT OVERWRITE |
|---|---|---|---|---|---|---|---|---|---|
| 1 | SPORTS | 6:00 PM 7:00 PM M-F | 1 | 1 WEEK | LEAST | 2:00 PM END Sa | 2 | 1 WEEK | |
| 2 | HOBBIES | | | | | | | | |
| 3 | NEWS | 6:00 PM 6:30 PM M-F | 2 | 2 DAY | LEAST | ALL | 3 | | LEAST |
| 4 | MUSIC | | | | | | | | |

A B C D E F G H I J K L M N O P Q R S T U V W X Y Z  HOUR  DAY  WEEK  MONTH  M-F  EXIT
0 1 2 3 4 5 6 7 8 9 * # - :  M T W Th F Sa Su  AM  PM  DAILY  WEEKLY  S-S  MOST  LEAST

Fig. 5

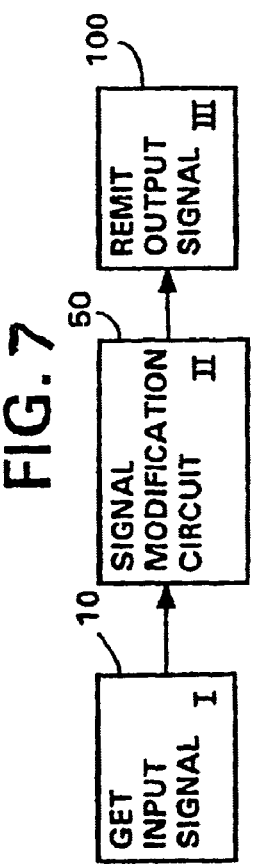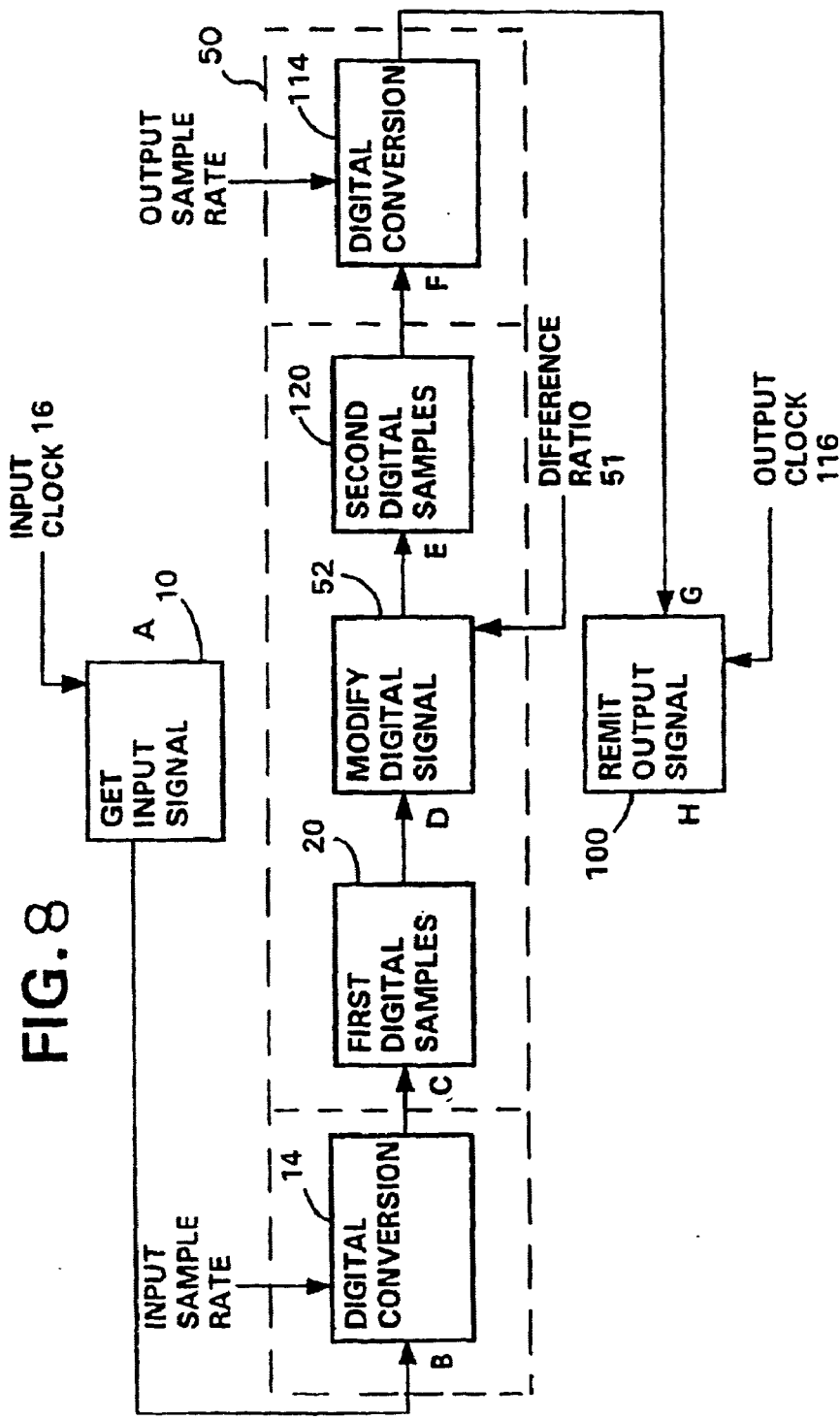

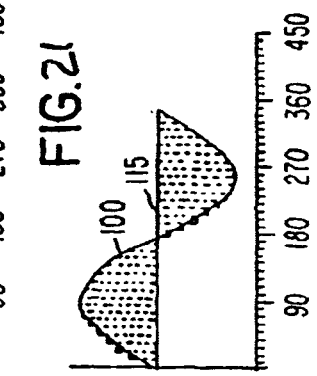
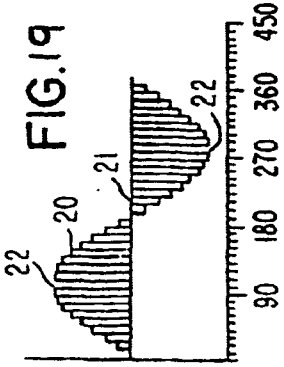
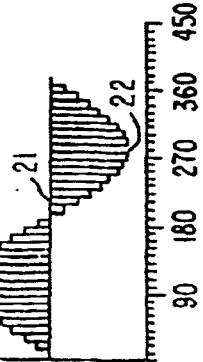
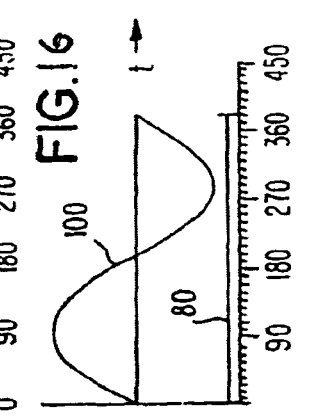
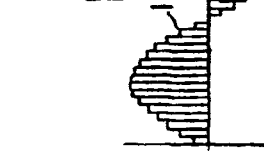
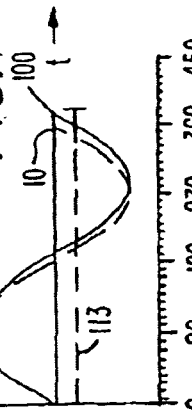
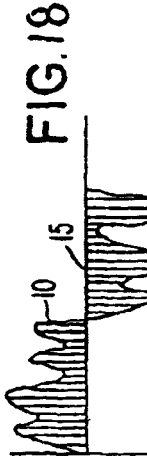
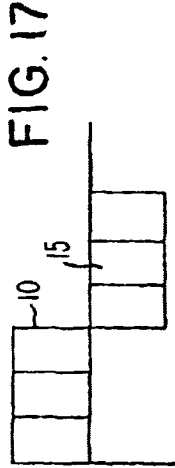
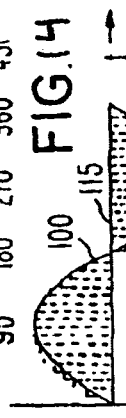
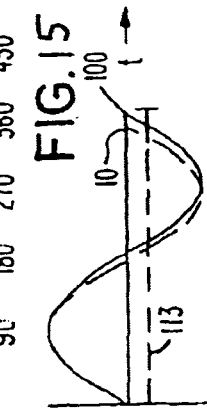
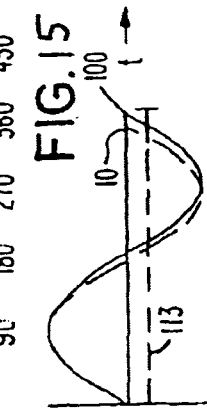
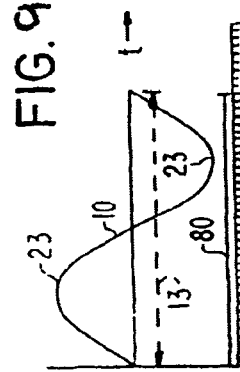
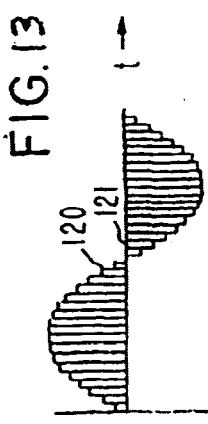
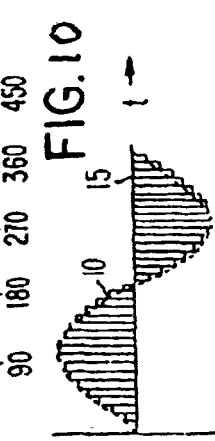
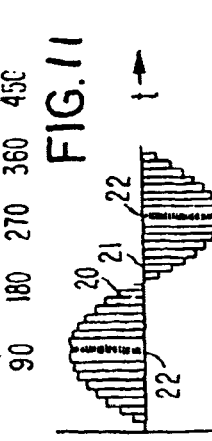

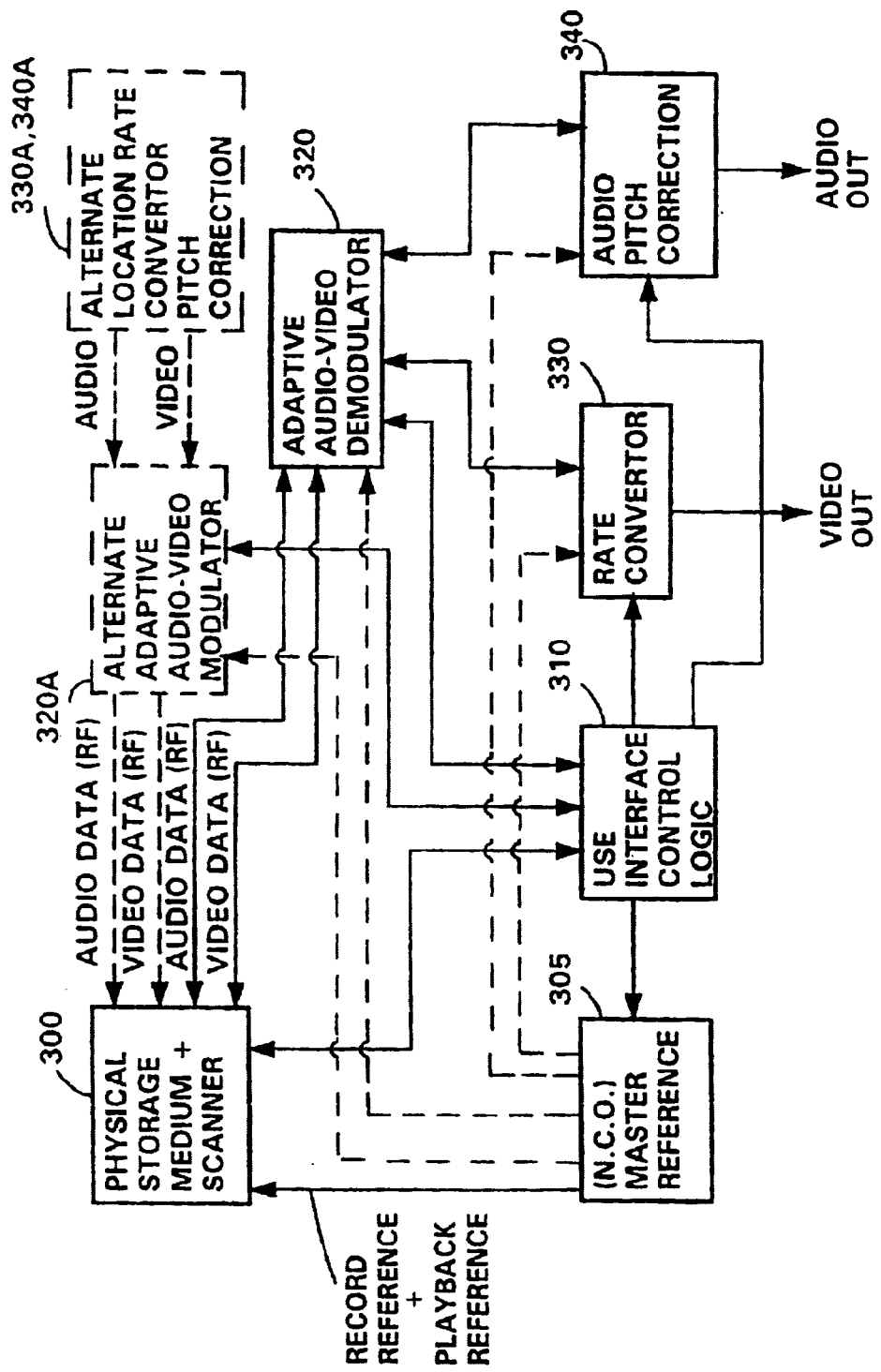

PROGRAM VIEWING APPARATUS AND METHOD

The application is a continuation-in-part of our prior application U.S. Ser. No. 08/322,069 filed Oct. 12, 1994 for a Frequency Convertor System now U.S. Pat. No. 5,920,842 issued Jul. 6, 1999, the contents of which are incorporated by reference.

BACKGROUND OF THE INVENTION

1. Field of the Invention

This invention relates to the field of delivery of programming, for example entertainment and educational programming such as that currently delivered by television and film technology.

2. Description of the Prior Art

In the Prior art it is known to deliver programming such as entertainment and educational programming by physical shipment of films and magnetic recording, terrestrial transmission of television signals via wires or fibers, transmission of radio frequency energy via satellite or otherwise. In particular, it is known to transmit multiple channels of television programming utilizing compressed digital or analog data over satellite and cable television systems. For all of these modes of transmission a user may typically either view the program as it is transmitted or may record a single transmitted program for later viewing. With present technology, however, it is normally required to have available one recorder for each transmitted program. Some in the prior art have attempted to develop a frequency converter system that would allow this to change with varying degrees of success.

Although some of these frequency converter systems functioned properly, many of these frequency converter systems were excessively complex and costly to manufacture. Accordingly, the frequency converter systems of the past have not found wide use in the media art.

Frequency converter systems of the prior art include U.S. Pat. No. 4,829,257 to J. Carl Cooper for an Improved Device for Accurately Phase or Frequency Shifting an Input Signal. This invention essentially incorporated a variable resistor extending between at least two known phase shifted values of the input signal. U.S. Pat. No. 4,868,428 to J. Carl Cooper discloses an Apparatus and Method for Accurately Shifting the Phase or Frequency of a Complex Signal. U.S. Pat. No. 5,097,218 to J. Carl Cooper discloses an Apparatus and Method for Accurately Multiplying the Phase or Frequency of Complex Time Varying Signals by a Given Factor Which May be Non-integer. The contents of these patents are incorporated by reference.

OBJECTS OF THE INVENTION

It is an object of the invention to provide an improved program delivery apparatus and method which is compatible with existing program delivery systems and provides the user with improved access to such programming. In particular, as described below, it will be possible for each user to select and view one and/or multiple programs virtually at random (within the limits of storage availability) whenever he desires. In addition, it will be possible for a user to stop or suspend viewing in the middle of a program (such as to accommodate interruption by a phone call which may also be provided by the present invention) and to continue viewing after the interruption without missing any of the program. During the time the viewer is occupied with the phone call the incoming program would be recorded. Further, the user can manually and/or automatically accelerate programs to accommodate for the time lost and/or otherwise compensate for time without objectionable artifacts. In addition, previously stored programs may be viewed at accelerated (or decelerated) speed, or repeated or portions reviewed, all upon the viewers wish, via the frequency convertor for example or otherwise.

This system provides a user with the ability to change the frequency of the produced signal by a percentage function based on the ratio between the lengths of time of production. Alternately the user can change the frequency of a real time signal (i.e., without altering the time period of production). For example, it might be desirable to replay a prerecorded thirty (30) minute television program in a time duration of twenty eight (28) minutes in order to fit a time slot without the associated seven percent (7%) increase in frequency. The replay of a prerecorded thirty (30) minute television program in twenty seven (27) minutes would allow alternately for the three (3) minutes of phone calls or other activities during the program. The present invention also allows shows to be expanded to fit time slots.

In another example, entertainment or educational programs or movies could be presented in shorter time to reduce the operating costs or to allow more movies to be shown in an evening. A similar advantage could be realized in the replay of prerecorded music or voice on a radio station. Messages from an answering machine could also be accelerated, perhaps greatly, for rapid playback while retaining normal voice frequencies. Again, the present invention allows this without the pitch shift artifacts that would otherwise be ascertainable to the consumer. Another example would be to lower the occupied bandwidth of a signal to be transmitted over a radio propagation or other transmission medium. This is a major thrust of this present invention. In this specification, the data may be fed into a large memory (for example 4–5 gigabytes), perhaps intermittently, at one speed and fed out at a second (normally slower and perhaps constant) speed, thus facilitating signal presentation and/or data operations. Another object of the present invention is to provide an improved apparatus and method for frequency conversion capable of decreasing or increasing the time base of a signal without a significant change in frequency. Another object of the present invention is to provide an improved apparatus and method for frequency conversion capable of a significant decrease or increase of the time base of a signal without significant change in perceptible frequency.

Another object of the present invention is to provide an improved apparatus and method for frequency conversion capable of use with a computer based storage and retrieval system of prerecorded programs or information. A further object of the present invention is to increase the reproduction utilization capabilities of video and audio recorders, movies and films, answering machines, voice mail boxes, and other signal storage systems. Other objects and a fuller understanding of the invention may be had by referring to the following description and claims, taken in conjunction with the accompanying drawings, in which:

BRIEF DESCRIPTION OF THE DRAWINGS

FIG. 4 shows a program recording priority spread sheet form of the present invention.

FIG. 5 shows the spread sheet of FIG. 4 with typical user entries.

FIG. 7 is a block diagram of the theory of the frequency conversion;

FIG. 8 is a block diagram illustrating an improved frequency converter system connected to an example input signal having a first frequency sustained for a first length of time for generating an example output signal having substantially the same first frequency sustained for a second length of time;

FIG. 9 is a graph illustrating a single cycle of an example input analog signal at a first frequency;

FIG. 10 is a graph illustrating a translation of the single cycle of the input analog signal of FIG. 8 into digital form;

FIG. 11 is a graph illustrating the selection of a digital sample for the signal of FIG. 9;

FIG. 12 is a graph illustrating the addition of a duplicate of the selected digital sample from the samples of FIG. 10 to provide a sample digital form of a modified output signal;

FIG. 13 is a graph illustrating a type of linear interpolation of the signals of FIG. 11;

FIG. 14 is a graph illustrating a transformation of the digital samples of FIG. 12 into an output analog signal;

FIG. 15 is a graph comparing a single cycle of the input signal of FIG. 8 and the output signal of FIG. 13;

FIG. 16 is a graph setting forth the output signal of FIG. 13 as actually perceived by the consumer due to its production at a higher reproduction rate than the input signal of FIG. 8;

FIGS. 17–18 are drawings demonstrating the sampling and nature of signals;

FIGS. 19–21 are figures like FIGS. 11–13 showing an example deletion of a digital sample;

FIG. 31 is a block diagram of a circuit for signal playback;

DESCRIPTION OF THE PREFERRED EMBODIMENT

Figure 1:
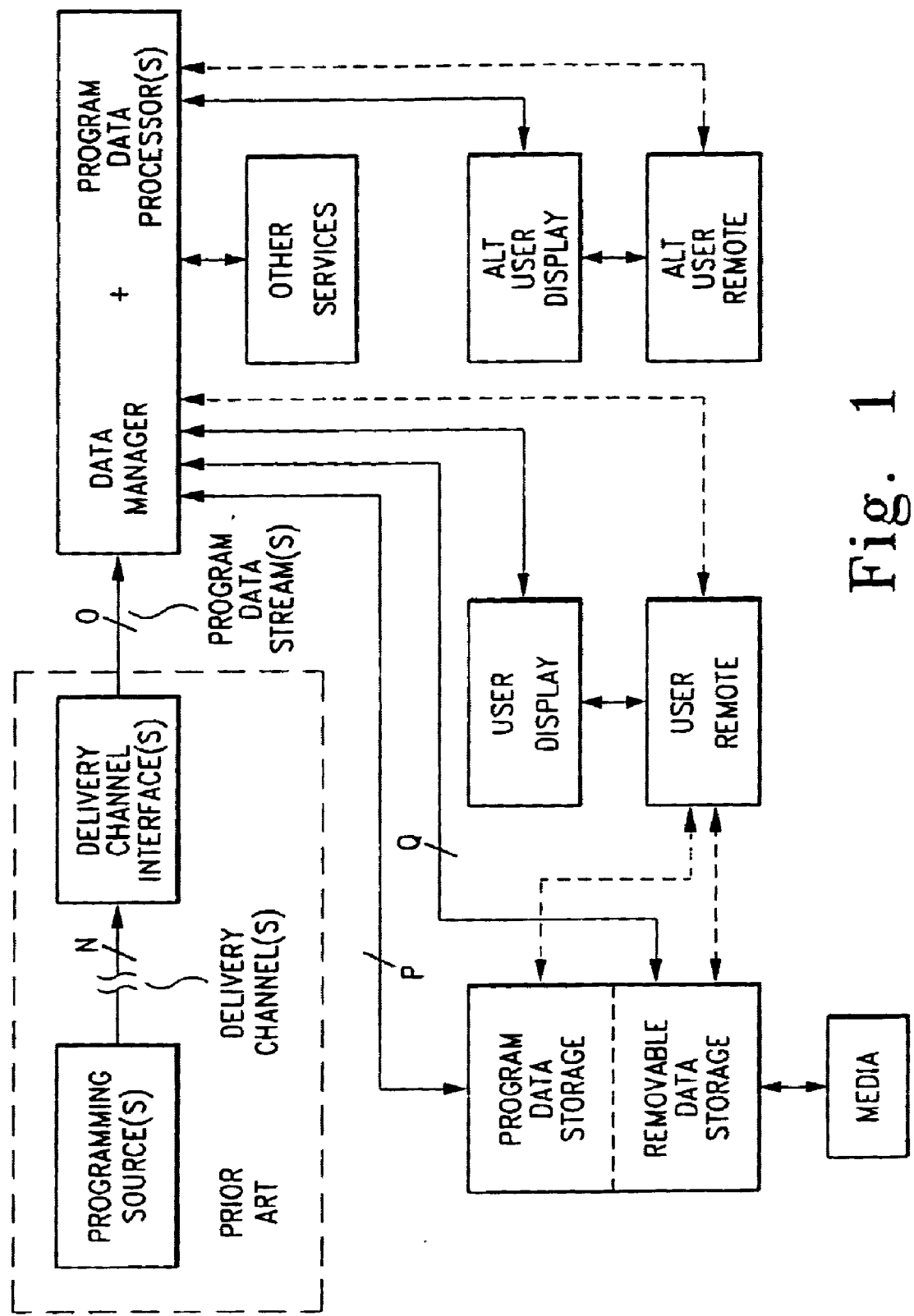
FIG. 1 shows a diagram of the preferred embodiment of the invention.

FIG. 1 shows a diagram of the preferred embodiment of the invention as used in a home or business environment. FIG. 1 includes an example programming source and delivery channel which provide program and/or data material over a delivery channel, a delivery channel interface coupled to the delivery channel and operable to receive said program material and/or data therefrom and provide said program material and/or data in a stream to a data manager including a program data processor and a program data storage, said data manager being coupled to the program data storage to store selected portions of the program material and/or data in the program data stream, with the data manager also preferably coupled to a removable data storage to store selected portions of the program material and/or data in the program data stream or previously stored program material and/or data from the program data storage on a removable media, and with the data manager also coupled to a user display via a program data processor to retrieve and/or access program material and/or data from the program data storage, removable data storage and/or program data stream or a combination thereof to provide and/or access program material and/or usable data to a user such as a user display including a computer, with said user display being coupled to a user remote whereby the user may interactively program and control the data manager and other components in order to select, control and/or utilize the program and/or data being accessed. The data manager also is coupled to an alternate user display which is coupled to an alternate user remote which allows the same and/or other program material to be displayed and/or utilized including separately from the first user.

It will be understood from the teachings herein that multiple delivery channels, delivery channel interfaces, program data streams, program data processors, user displays, computers, and user remotes may be utilized individually or in combinations as desired to provide control and/or multiple operations with multiple programs or users. For purposes of the present disclosure, the following terms are given the following definitions which are somewhat broader than the definitions normally associated with the term.

Program is the information having some intrinsic value which is of use or interest to a person, being or thing. Program shall encompass both normal information such as commonly known entertainment programs (for example movies and live television programs), informational programs (for example commercials and educational classes) and any other information including of an audio, video, text, data or natural type which may be of value to a particular user. Program includes singular information, multiple information, and combination information.

Programming takes on two meanings: the first is the creation, generation, providing or distribution of one or more program and/or data streams, the second is the programming of the operation of the invention and its usage and/or access of the programs. The meaning being used will be apparent from the context.

User is the person, being, thing, facility computer, or location which receives and/or uses one or more program. User may be referred to as a location, i.e. the User Location. There is no requirement that there be only one user, or that a user who operates the invention be the same user who utilizes the program. There may be multiple simultaneous or sequential users. Additionally, the program data stream and/or program data storage may be considered a user in that it may automatically operate the invention to provide information which the invention utilizes to determine the need, and/or priority for storing or displaying a program. There may be another user who is a person simultaneously watching or utilizing a stored program.

Viewing is the use of information by the user and shall include visual use, auditory use, computer use and/or virtual use as will be apparent from the context in which the term is used. Viewer is a user which is viewing.

Display is the presentation of information for possible utilization, for example by viewing (that is seeing and/or listening) or processing (that is utilizing at a then non-recognizable level). User Display is the presentation and/or utilization of information for possible utilization primarily by the User, for example by viewing, which information may also be utilized by others.

Data shall apply to the information of any nature carried or stored by the media, channel or interface and will be recognized by one of ordinary skill in the art to take on different forms including programs as will be apparent from the context of the usage.

Channel is used both in the communications theory sense where it applies to the means or mechanism by which data is stored, transmitted or delivered, and is also used in a program sense such as conventional television channel sense where it means a traditional broadcast, cable, satellite or tuner channel, which usage will be apparent from the context.

Key is an actuator or circuit suitable for interface with and/or operation by the user. Key Label is an identifier associated with a Key and which is preferred to be recognizable by the user.

In FIG. 1, programming is provided at a source by any of the known methods for actual programs and/or data, such methods including optical disk, magnetic disk, film, recordings, electronic memory, hard drives, etc.

For the preferred embodiment, a television video file server such as the Hewlett Packard video file server available from Hewlett Packard of Palo Alto, Calif. is utilized. It is preferred that the program for this example system consist of television video, multiple audio and ancillary data including closed captioning, time code, presentation time stamp and program schedule information such as those commonly known in the art and/or primary data. The program is preferred to consist of multiple simultaneously provided programs and/or data. The programs of this preferred example system are preferably compressed or redacted, for example according to the MPEG2 standard, and coupled to N multiple delivery channels for satellite or other transmission over a large area of land whereby it may be received by numerous users, all as commonly known in the art.

Although such programming services and delivery channels are commonly known in the art, it will be suggested herein that these commonly known facilities may be modified to further accommodate the present invention. For example, at the User location, the transmitted programs are received by one or more delivery channel interfaces which couple to the N particular delivery channels and provide O program data channels, where N and O are numbers represent 1 or more and need not be the same. It is preferred that all of the associated data for each of the programs be provided on a single MPEG 2 compressed data stream out of the delivery channel interface from which the data is recovered, for example all of the television video, multiple audio and ancillary data including closed captioning, time code, presentation time stamp and program schedule information for a particular program be carried together on a single MPEG 2 format program data stream.

The O program data streams are coupled to a data manager having one or more associated program data processors. The data manager is preferred to operate to store all of the O program data streams in a program and other data storage device as the data streams are presented. It is preferred that the data storage device have a random access capability such as that provided by semiconductor, magnetic or optical storage technologies, such as known computer industry RAM, hard disk and optical disk drives. The data storage device could also have sufficient speed and memory to capture all incoming programming for later individual non-real time processing. It will be recognized that there is no requirement as to the data rate or regularity or speed of transmission of programs, although it is preferred that the Data Manager and Program Data Storage operate to receive and store program data as it received.

It should be pointed out that with a finite amount of program data storage capability, sooner or later there will be no more storage available for incoming programs. When that event occurs or when it is identified that that event is nearing occurrence, the Data manager is preferred to be previously programmed to start losing or discarding known previously stored data or data types according to a known set of priorities. It will be noted that the known set of priorities may be changed from time to time as will be described below. Upon the identification of no more storage being available for incoming programs, and the possible resultant loss of previously stored data, it is preferred that overwriting occur based on the amount of remaining storage and the rate of desired incoming program data, based on parameters and priorities which may be selected by one or more chosen user. In this respect, it is preferred that any multiple viewers are to be given priority such that a higher priority user's inputs are performed at the expense of a lesser priority user's inputs in the event both can not be accommodated. As an example, the user could choose to store all of the programs from a particular program, network or service (for example a news program or data stream) while ignoring, overwriting or not storing another particular program, network or service (for example a court room television channel). As an additional feature, the user may direct the Data Manager to keep memory available for a particularly desirable program, network or service, and/or to only store a given quantity of one or more program network or service. For example, the user may direct the Data Manager to only store the last three days worth of channel A, the last four programs of program B, none of program C, none of channel D and to always store programs of type E. Quantities may be chosen in units of time, programs, elements of a series or according to program, channel, network or service content or combinations thereof. It will be recognized that such complexities tend to create exponentially growing requirements on the Data Manager with each additional parameter, such capability is still well within the abilities of current programming and computer operation capabilities of those of ordinary skill in the art. Additionally, it will be recognized that a Removable Data Storage capability (in addition or separately) may be required or desirable with the user having the ability to direct the Data Manager to cause a known program or programs to be stored thereon either from the Program Data Storage, or directly from the Delivery Channel Interface. The Removable Media may then be physically removed and/or replaced—for example for storage for archive purposes or to be moved to other locations.

The selection of such program or programs may also be subject to the same or different selection requirements and priorities, as the program data which is stored on the Program Data Storage. Program data from removable Data Storage Media may also be read therefrom for example via media previously archived or received from other locations.

The Data Manager & Program Data Processor(s) also couple to one or more User Display which is preferred to be a video CRT, LCD or Active Matrix type display and associated audio transducer such as a speaker set or headphones. Each User Display also couples to a User Remote which is preferred to be a keypad or keyboard which is preferably wirelessly bidirectionally coupled thereto, such as by infrared beams. It is preferred that the User Remote additionally have the capability to program and reprogram the keys thereon, in order that a small number of keys may perform multiple functions, and/or in order that the user may chose convenient key labels for the keys which facilitates the viewers identification and use thereof.

It will be recognized that it will also be useful for the User Remote to contain a message display, for example such as an LCD readout, beeper or speaker, which allows the user to receive messages directly or indirectly from other parts of the system without having to receive them from the User Display. This is especially useful for Human viewers where an audible signal would aid in locating the remote or signaling invalid operation, and an LCD display would allow messages to be displayed during programming type operations without requiring the user to look away from the remote. It is desired that the Data Manager also include one or more Program Data Processor which function to convert the MPEG 2 format program data stream from the Delivery Channel Interface, Program Data Storage and/or Removable Data Storage into a format which may be displayed on the User Display. In addition, it is preferred that the Program Data Processor provide capabilities for displaying multiple programs on the User Display, such as can be provided by displaying different programs in multiple windows on a CRT type video display, and for providing special effects such as spatial manipulations or enhancement of images or of sounds and quick viewing and time compression (or expansion) capability, for example such as that described in copending U.S. Patent application Ser. No. 089,904. Also, it is seen in FIG. 1 that the Data Manager may be coupled to Other Services, for example such as telephone wire, fiber and other terrestrial communications, remote video cameras, alarms and actuators, such as baby room monitors and doorbells.

Communications with the Programming Services which operate the Programming Sources to provide the Programs over the Delivery channels is an important capability provided by the Other Services. In this fashion account charges and payments may be made at the Users wish, for example to automatically arrange for payment for pay per view or other special programs.

Of special importance is the ability to interface with program guide services which provide information on upcoming programs. In this fashion, the Data Manager may display lists or charts of upcoming programs along with other program information thereby allowing the User to select wanted ones of the upcoming programs for storage. It will also be noted that many times such upcoming program information is carried a's embedded information on the Program Data Streams themselves, thus the Data Manager may acquire this information directly from the data stream.

The components used to practice the invention of FIG. 1 are individually available to one of ordinary skill in the art. The components may be procured and interconnected by one of ordinary skill without undue experimentation or further invention by resorting to the teachings herein taken in accordance with the prior art. For example, the Programming Source may be provided by the aforementioned Hewlett Packard video file server and the DiviCom MPEG-2 Encoder, MPEG-2 ReMultiplexer operating with the DiviCom MPEG-2 System Controller available from DiviCom, Inc. of Milpitas, Calif. The Delivery Channel Interface may be provided with one or more standard receiving devices well known in the industry, for example a standard satellite DSS tuner such as manufactured by Thompson under the RCA brand name in Indianapolis Ind. Data storage by the Program Data Storage and Removable Data Storage is preferred to be provided in a single unit which operates with removable writable optical discs. These functions may be separated however if desired, for example to utilize lower cost storage such as computer hard disks or faster semiconductor memory for the Program Data Storage. The Program Data Storage may be provided for analog or D1 video and audio by the RAMSES video ram recorder available from EVS Broadcast Equipment of Lie'ge Belgium or by the DLC-V500 available from Pioneer of Long Beach Calif. The DLC-V500 utilizes removable optical discs for storage and may also provide the Removable Data Storage either as a separate unit or in combination with the Program Data Storage combined in a single unit. Both the Program Data Storage and the Removable Data Storage may also be implemented for storing the MPEG-2 compressed program data stream with standard computer storage technology, computer hard drives and optical WORM drives respectively. Decoding of the MPEG-2 data stream from any of the sources may be performed with the DiviCom companion consumer, commercial or professional decoders, and provide standard analog or digital video signal(s) for use by the User Display or the RAMSES recorder. The technology for the User Display and infrared technology for communications with the User Remote are commonly available in consumer television sets. The Data Manager and communications with the User Display may be implemented with a personal computer such as any of the common multimedia Pentium based computers or a VME bus computer such as the Sun Sparc. Video interface and Digital Signal Processing boards which may be used to implement the Program Data Processor are available from numerous DSP companies including Atlanta Signal Processors, Inc. of Atlanta Ga., Ariel Corporation of Highland Park, N.J., Analogic Corporation of Peabody, Mass., and Traquair Data Systems, Inc. of Ithaca, N.Y. Interface cards to interface the computer to the other services are readily available, for example the IBM WindSurfer Communications Adapter from IBM Corporation, Research Triangle Park, N.C..

Figure 2:
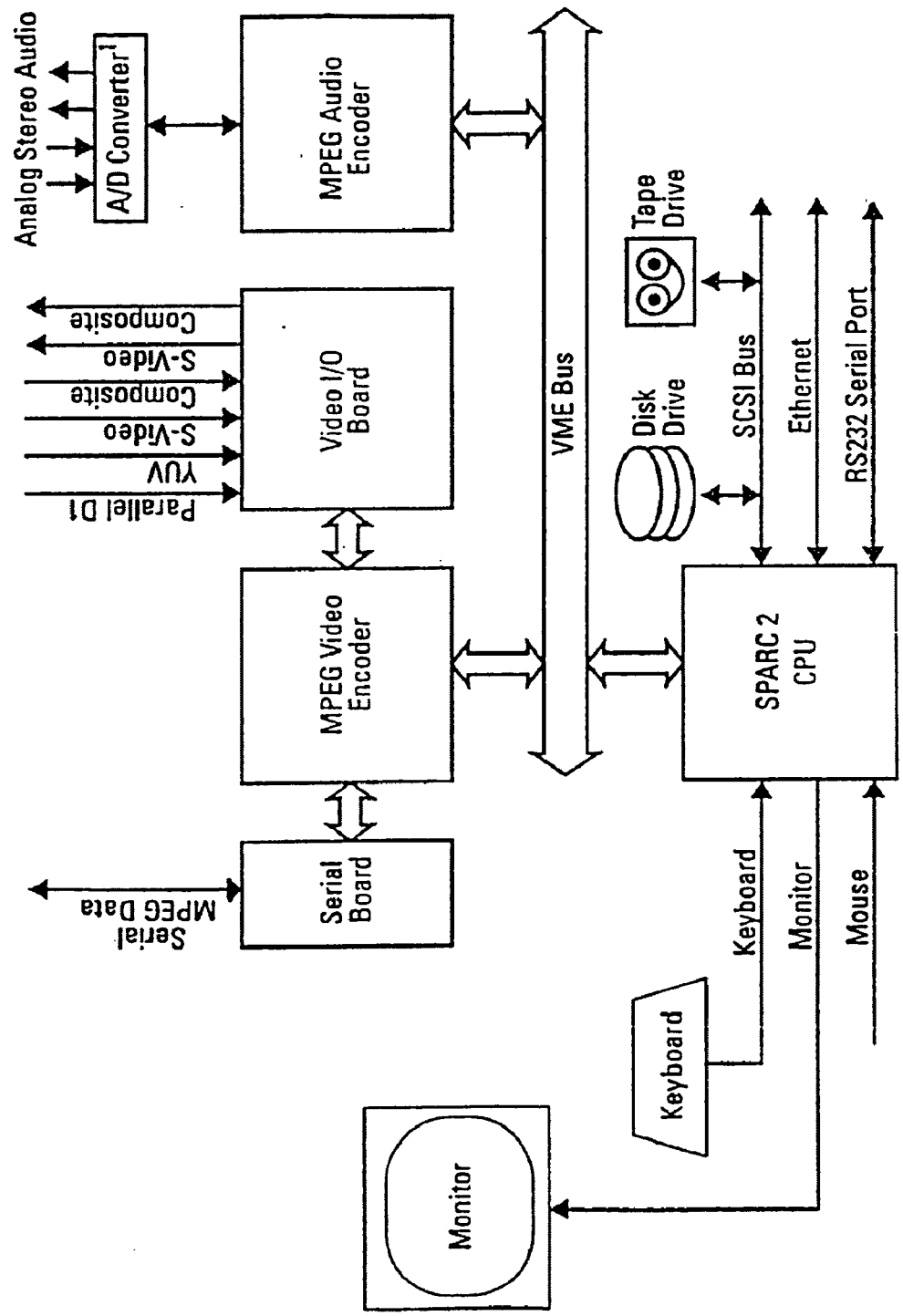
FIG. 2 shows a diagram of a prior art MPEG 2 Development system.

FIG. 2 shows a prior art MPEG-2 development system which may be used by those who wish to implement and practice the invention on existing hardware with suitable modifications. The C-Cube MPEG 2 Development system available from C-Cube Microsystems of Milpitas Calif. provides a Sun Microsystems Sparc plug in card (VME bus) which provides analog or D1 digital video input, analog video out, stereo analog audio in and out, control of external devices (such as an HP video file server or EVS RAMSES) via RS232 port, user keyboard, full color monitor, storage of MPEG encoded Video on both hard drive and removable tape drive via SCSI bus, Ethernet communications and serial MPEG data communications. To practice the invention, one adds the necessary programming, wireless communication and the User Remote, which may be achieved via the RS232 serial port or Ethernet, and to connect an MPEG program data stream from the Delivery Channel Interface via the serial MPEG data port. Similar development systems are available from other manufacturers. Programming of the hardware operation is provided via the keyboard and will be well within the capabilities of one of ordinary skill in the art from the teaching herein.

Figure 3:
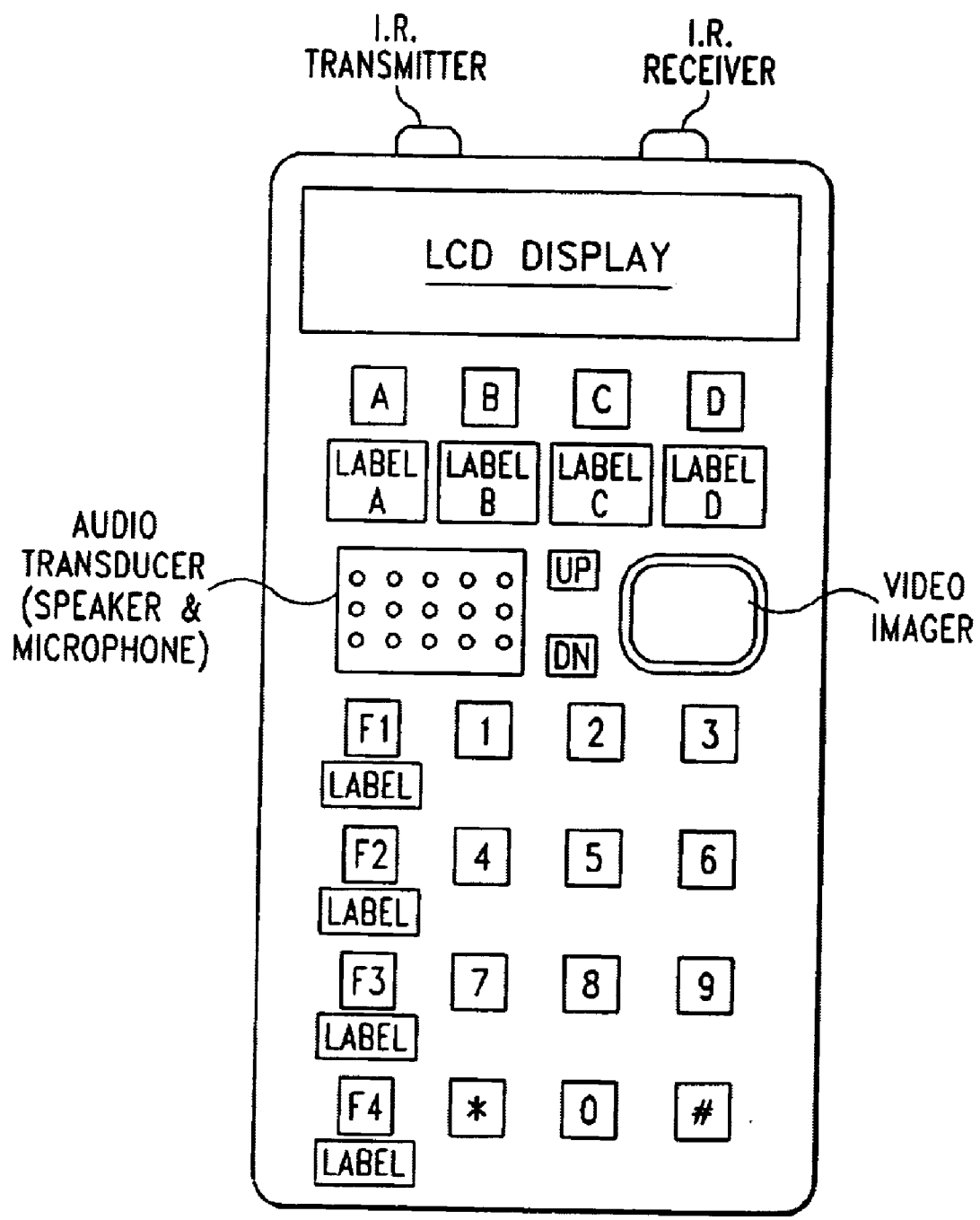
FIG. 3 shows a diagram of the preferred embodiment of the User Remote of the invention.

FIG. 3 shows a diagram of the preferred embodiment of the User Remote of the invention. While the User Remote is shown in its preferred embodiment form for use by a person speaking English, it will be understood that it may be modified as appropriate to accommodate persons speaking other languages, or with various handicaps, or to operate with mechanical, electronic or optical interfaces, the latter being particularly well suited for interfacing with other devices. The preferred User Remote of FIG. 3 contains an infrared transmitter and infrared receiver for communications with the User Display or other components of the invention by way of infrared light beams, an LCD display and video imager for visual interaction with the user, the video imager for imaging scenes or materials which the user points the imager to and the LCD display for displaying text messages, graphics or images to the user, programmable keys A, B, C, and D each having a programmable label A, B, C, and D, respectively, an audio transducer consisting of a speaker and microphone for audio interaction with the user, up and down keys for communicating the users desire to increase or decrease a particular function, configurable function keys F1, F2, F3 and F4 with associated configurable labels, and a standard 12 key numeric keypad. The standard 12 key numeric keypad is preferred to be fixed in programming and configuration, and to have nonchanging labels, however if it is desired to facilitate more extensive capabilities the keypad may also be programmable or configurable, and have associated changeable labels.

In operation, the user stimulates or actuates the various keys and sensors in proper sequence and combination in order to direct the Data Manager and other components of the system to perform in a fashion to present to the user the desired program material and/or access desired information on the User Display or User Remote. It will be recognized that the Data Manager is capable of communicating with the User Remote to both configure the programmable keys A–D and program their associated labels accordingly, as well to display any desirable messages on the LCD display or couple any desirable sound to the audio transducer. In this fashion the User Remote may function to operate, via the User Display and Data Manager, all needed system functions. It is also recognized that the User Remote may operate directly with other system components to perform wanted functions. As an example of the preferred operation of the User Remote in the present invention, in normal operation key A is labeled sound, and when the operator actuates the A key the message "UP FOR LOUDER-DN FOR SOFTER" appears on the LCD display. By actuating the UP or DN key the operator controls the sound level. Similarly, the B key is used to change the channel up or down, the C key is used to speed up or slow down the playback speed of previously stored programs, and the D key is used at the first actuation to temporarily stop the playback of the program (this operates with program from the data stream or previous storage as will be discussed below) and at the second actuation to continue the program from where it stopped. Similarly, the programmable function keys normally operate with F1 being used to initiate or answer phone (or video phone) calls, much like lifting the handset on a standard telephone, F2 to replay previously stored phone messages much like pressing the play button on a standard answering machine, F3 to select programmable attribute menus for configuring the operation of the system and F4 for selecting programmable display functions of the User Display. Function key F4 operates to inform the Data Manager to display graph functions for COLOR, HUE, BRIGHTNESS and CONTRAST on the User Display, or alternatively on the User Remote LCD. In addition, keys A–D and their labels are reconfigured to indicate COLOR, HUE, BRIGHTNESS and CONTRAST, with adjustment of the particular function desired performed by actuating the associated key followed by the UP or DN key. A second press of the F4 key operates to inform the Data Manager to display graph functions for frequency equalization of the audio reproduction on the User Display, or alternatively on the User Remote LCD. In addition, keys A–D and their labels are reconfigured to indicate they are in use for the functions of left to right and front to back balance of the sound channels. Adjustment of the frequency response is performed by actuating the numeric key associated with the desired frequency to be adjusted (as indicated on the graph display), followed by the UP or DN key.

Function key F3 operates to inform the Data Manager to display the first level menu selections on the User Display or User Remote, and to reconfigure appropriate programmable keys and associated labels accordingly. It may be noted that it is preferred that one of the menu selections will be to display menus on the User Display or User Remote LCD or both. After all key actuations, it is preferred that a timer be started which will return the User Display and User Remote to the previous operation 10 seconds after the last key press, in order to resume normal displays. Alternatively, one or two of the programmable keys may be programmed to perform CANCEL or END functions.

FIG. 4 shows the spread sheet of the preferred first menu available under the F3 key, this menu allows the operator to select individual incoming program data streams to be stored or ignored and their method of display. For purposes of explaining the instant invention it will be assumed that there are four incoming data streams corresponding to four programming services or networks which provide SPORTS. HOBBIES NEWS and MUSIC. Other data streams could also be utilized.

The User Display or User Remote LCD lists a spread sheet type display with the left most entry being the Program Data Stream Number with vertical columns for IDENTIFIER, PROGRAM STORAGE TIME 1, STORE PERIOD, MOST/LEAST RECENT OVERWRITE, STORAGE TIME 1 PRIORITY, PROGRAM STORAGE TIME 2, STORAGE TIME 2 PRIORITY, STORE PERIOD, MOST/LEAST RECENT OVERWRITE. If desired, additional entries may be provided for.

The IDENTIFIER column is used by the user to enter a unique identifier made up of symbols, alpha or number characters or both by which the program data stream is to be known by the user, for example SPORTS for Data Stream 1, HOBBIES for Data Stream 2, etc. Such capabilities are described in considerable detail by Beery in U.S. Pat. No. 5,068,734, which prior art patent is incorporated herein by reference. The characters, symbols and other information for entry in the spread sheet may be selected from a list at the bottom of the spread sheet display by use of the programmable keys A–D which are programmed and labeled to act as cursor movement keys.

The function key F1 is configured to act as a select key to first select the spread sheet location into which information is being programmed and then select the character, symbol, etc. on which the cursor is placed. Information so entered via the User Remote is transmitted to the Data Manager which records and stores the information and uses it to facilitate User selection of programs to be watched as described by Beery.

The PROGRAM STORAGE TIME 1 column is used to enter a range of times during which a storage priority is to be assigned to the corresponding program data stream. For example, if the User wishes to record a sports highlights show which is transmitted from 6:00 to 7:00 PM Monday thru Friday, this information is entered via cursor movement as previously described.

The STORAGE TIME 1 PRIORITY is a numerical priority which is used to determine what programs are overwritten in the event of insufficient memory. The lower the priority number the more desired the storage of the program. Thus if it is desired to store two programs at the same time, and memory is only available for one, the higher priority (lower number) program is stored. In addition, if insufficient memory is available and there is a lower priority program already stored in memory the higher priority program will overwrite it. The STORE PERIOD lets the User assign a length of time the program is stored before is may be overwritten by a lower priority program.

The MOST/LEAST RECENT OVERWRITE lets the User choose to have the incoming program overwrite the most recent or least recent stored version of the same program if there is no memory available to store an incoming program because of relatively low priority as compared to what is stored in memory.

A second set of storage parameters is also preferably provided in order to allow more storage selections. If desired, even more storage parameter sets may be provided. After filling in the desired information, a typical spread sheet might look as shown in FIG. 5. Note that there are two #2 priorities in these entries. This is acceptable because they take place at different times. In the event the User attempts to enter conflicting information which the Data Manager would be unable to accommodate, a warning is preferably provided, such as by causing a short beep to be emitted from the audio transducer and flashing the conflicting entries. After finishing the entries of information in the spread sheet, the user exits that feature.

The F3 key shown also provides access to a listing of all currently stored programs in memory which the User may use to play back a stored program. The user will simply highlight the stored program he wishes to view with the cursor arrow keys (programmed key A–D) and again presses the F3 key. An exit option is provided and may be highlighted by the cursor with the F3 Key to exit. The F3 key further provides access to system default conditions. These defaults include the following: Allow overwrite of program after viewing entire program and allow overwrite of program minutes after viewing etc. These functions also determine how long to wait before a viewed program is discarded. For example it may be desired to retain educational programs, but to immediately discard entertainment programs. It further may be desired to allow access to specific programs or types by password. This prevents unauthorized persons from viewing identified programs. Playback speed is also setable. This feature allows stored programs to be played back faster (or slower) than normal, thus coupling the information or entertainment delivery to the viewers ability to receive and process. One can also select program types for storage and/or preferred viewing programs and program types. These are a user convenience features. Configuration to interface with other services allows the hardware to match the particular set of services the user desires. The Auto Store Buffer reserves time and overwrite priority. This allows a User to pause a program being received from the Program Data Stream with the invention operating to continue storing the received data so that when the User returns to viewing and disables the pause the User begins where he stopped without loss of program material. The buffer reserve time determines how much memory is reserved for this storage function and consequently how long the User may keep the system in pause and be guaranteed of no loss of program. The Auto Store Buffer catch up rate allows a user to return to viewing a program being received from the Program Data Stream after a pause, while insuring he will be viewing the stored portion of the program from the Auto Store Buffer. It is desirable to read this information out of the buffer at faster than normal rate. In this fashion, the program is read out of the buffer faster than the program being written into the buffer and consequently the buffer length will be continually shortened to zero. This feature both returns the User to real time viewing, thus allowing him to finish viewing the program when it actually ends so he can go on to watch another Program Data Stream program when it starts, and returns the Auto Store Buffer to an empty state in preparation for pausing at another interruption. It might be noted that when the stored portion of the program from the Auto Store Buffer is read out of the buffer at faster than normal rate, or when stored programs are read out at faster or slower than the normal rate, that an audio pitch shift and video motion artifact would normally occur. It is preferred to correct these artifacts by use of the invention described in copending U.S. patent application Ser. No. 322,069 [incorporated herein by reference].

The present invention includes a conversion system as set forth in Ser. No. 322,069 and devices that incorporate it, which conversion system can convert an input signal having frequency related information normally sustained over a first length of time into an output signal having substantially the same perceived frequency related information, with the information now normally sustained over a second length of time. Alternately just frequency, and/or frequency and length of time can be modified. The theory behind this operation is shown in the FIGURES, including FIG. 7. The theory behind the invention involves getting an input signal 10 (Block I). This signal has frequency based information sustained over a period of time. This input signal 10 is provided to a signal modification circuit 50 (Block II). The signal modification circuit 50 adds or subtracts samples 15 to or from the input signal 10 according to certain principles, mathematical principles normally based primarily on the ratio of frequency and/or time between the input 10 and output 100 signals and the complexity of the signals. The signal modification circuit 50 then remits an output signal 100 (Block III), which output signal 100 has a relationship to the input signal 10 as set by the certain mathematical principles. One skilled in the art should recognize that the devices disclosed in this application could alter frequency over the same length of time, alter frequency and length of time, and otherwise function. The easiest way to do this would be by altering sample and/or clock rates. For uniformity, this application will primarily utilize as an example devices producing an output signal that perceptibly has the same frequency related information as the input signal 10 and may also be sustained over a different length of time.

In this operation, both the input 10 and output 100 signals have frequency related information on them. The output 100 signal can be either expanded or compressed relative to the input signal 10. The signals themselves can be audio, television, computer signals, or other signals having frequency related information thereon. Further, the devices can be used in singular form (for example a television video signal), paired form (for example right and left stereo audio signals), or in other combinations including synchronizing the output signal to a related signal (for example synchronizing audio to video). The signals themselves can be in analog or digital form. A digital form is presently preferred in that technology is presently more established for digital processing of complex wave forms. However, with the increasing advances in analog circuitry including the use of charged coupled devices (CCD's), it is envisioned that soon analog processors may be able to process the complex signals as well and perhaps better.

The digital signals may be coded in pulse code modulation (PCM), pulse width modulation (PWM), pulse length modulation (PLM), pulse density modulation (PDM), pulse amplitude modulation (PAM), pulse position modulation (PPM), pulse number modulation (PNM), pulse frequency modulation (PFM), pulse interval modulation (PIM), or other coding scheme. Pulse amplitude modulation will be utilized in the explanation of the invention. The location of the signal modification circuit 50 in the overall replication path is not critical. In most instances, the signal modification circuit 50 would be located after some sort of signal storage means for modification of the stored signal. This is generally preferred in that the stored signal would contain the highest quality signal. Such stored signal could also be otherwise used. However, the signal modification circuit 50 could be located prior to the storage means or even within such storage means. The circuit 50 could also operate in real time. Further, the order of the conversion steps are not critical as long as all steps are accomplished. For example, the clocking shift and analog to digital conversion could occur prior to real time signal modification in the overall frequency conversion of an analog signal. An example of this would be playing an answering machine at high speeds with subsequent real time frequency conversion to lower the voice pitch to normal values.

Figure 22:
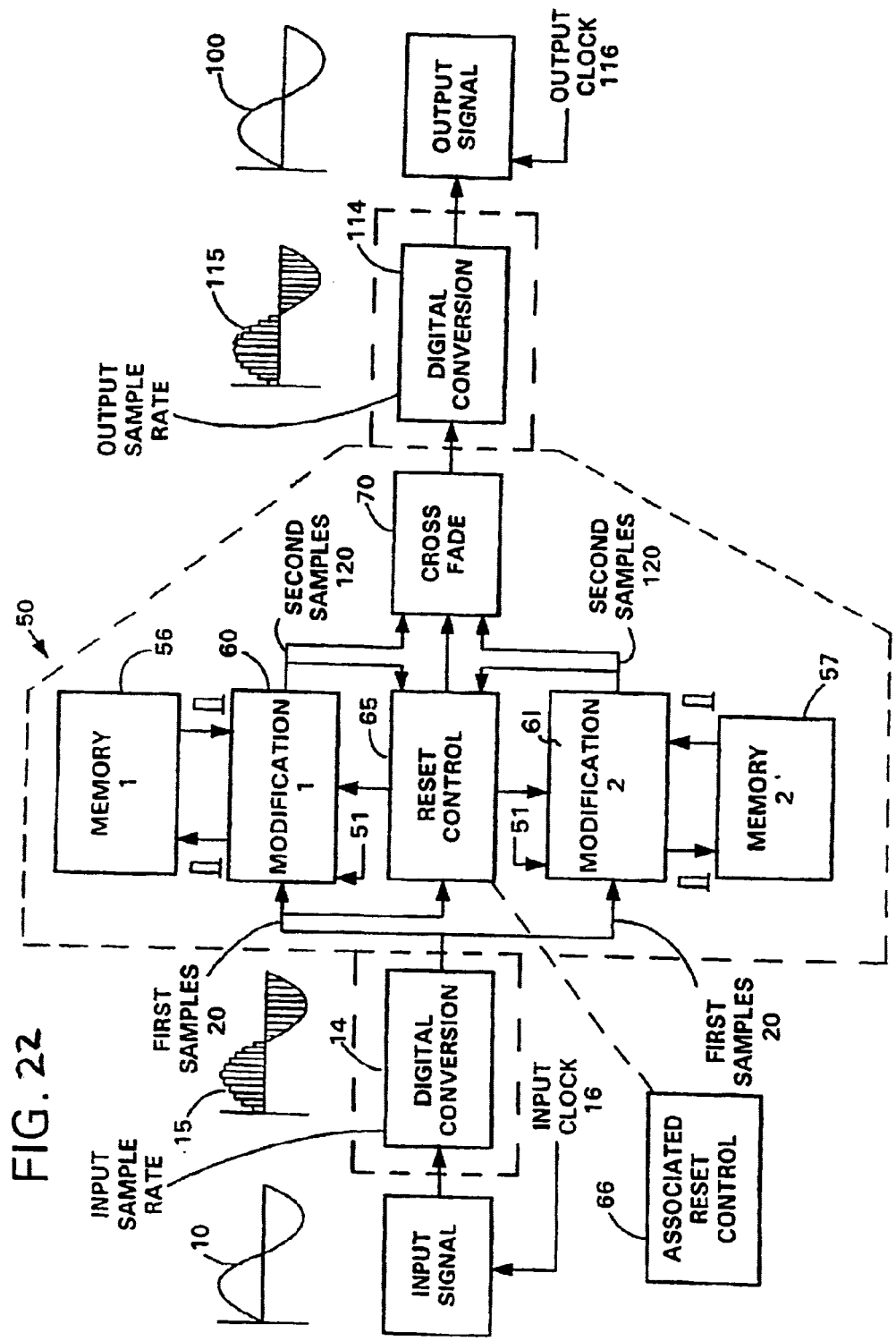
FIG. 22 is a detailed block diagram of a frequency converter system.

Further example in FIG. 7 the storage means could be located before/after or between any of the blocks of circuitry at points A–H respectively. The operation of the invention is thus also not dependent on a storage location. FIG. 8 is a block diagram of the signal modification circuit 50 receiving an input signal 10 sustained over a first length of time 13 at a first ascertainable frequency. In real time this length of time 13 would be the period of production of the input signal 10. As the signal 10 utilized as a uniform example in this specification is an analog signal, a digital converter 14 converts the input analog signal 10 into a digitally sampled version 20 of the input analog signal 10 (if the input signal 10 was itself digital or already a digitally sampled version of an analog signal, no conversion would normally be necessary; oversampling however, might be appropriate. The inclusion of the converter 14 in the modification circuit 50 is thus dependent on the nature of the processed signals). In the particular circuitry example of the figures, the input signal 10 is an analog signal having an alpha length 13. Here, applicant defines alpha length as the time duration of a contiguous signal block, exclusive of any reset operations (reset operations will be addressed in detail below). This input signal 10 is normally replicated over a certain time period, a period normally directly related to the alpha length. The input signal 10 normally exists for reproduction over a certain set length of time, a time length analogous to inverse clock rate including real time. In FIGS. 8 and 22, input clock refers to the speed of production or reproduction of the input signal. The input sample rate refers to the rate at which discrete time samples are presented to the signal modification circuit. The input clock and input sample rate may or may not be related. For example, if the input source is an analog tape player, the input clock would refer to the speed of the tape. Tape speed might be variable, while the input sample rate may or may not be variable. As another example, the input source may be a compact disk player outputting digital samples at a 44.1 kHz rate. In this case, no continuous time to discrete time conversion is necessary. If no sample rate conversion was used, the input sample rate would here be the same as the input clock rate. If the speed of playback of the compact disk was varied, then both the input clock and input sample rate would vary. The output sample rate is the rate at which discrete time samples are output from the signal modification circuit. It may or may not be equal to the input sample rate. The output clock rate refers to the speed of production of the output signal, and may or may not be related to the output sample rate. The input signal 10 is normally preferably fed into a digital converter 14 in order to replicate such input signal 10 in digital samples 15. The nature and rate of the digital sampling is selected in accord with the overall circuitry design. Examples of the type of digital sampling that can be utilized have been previously set forth. For uniformity, the preferred embodiment of the invention will be set forth with pulse amplitude modulation (PAM) digital sampling.

It is preferred that the digital coding and/or rate be selected in respect to the nature and frequencies of both the input and output signals. For example, according to the sampling theory, a sampling rate of a little over twice the highest expected frequency will allow for the accurate reproduction of an analog signal with minimal distortion. An example of this is the 44.1 kHz sampling rate for common compact disks. In addition to this, the sampling rate must be selected in order to provide for the compression/expansion of the signal in an accurate manner. This entails a review of the signal content. In specific, if a computer on/off binary signal was involved with a conversion of 3:2, a sampling rate three times the clock speed of the input signal would provide for completely accurate conversion (FIG. 11). However, with an audio signal at the same somewhat extreme example 3:2 reduction, a sampling rate of twice the frequency of the input audio signal (for example a sampling rate of 44.1 kHz) would provide a normally unacceptable result due to the distortion on the output signal 100. The reason for this would be that aliasing would occur if one third (⅓) the samples were removed. It is therefore necessary to sample the audio input signal 10 at a rate much higher than the Nyquist rate in order to provide for an acceptable output signal for the analog signal (FIG. 17). Over and above this restriction, it is preferred that any input signal 10 be sampled at as high a rate as possible, in order that the addition/deletion of individual samples would have a minimal effect on the information available on such input signal 10. For example, the deletion of one out of every ten samples at a 10,000 times over sampling rate would have less artifacts than the deletion of one out of ten samples at a ten times oversampling rate although both provide the same 10 percent (10%) signal compression. The reason for this is that with higher rate sampling, the many artifacts which would be produced would occur at an extremely high frequency, with many occurring at a frequency above that perceptible to the senses of the consumer. The Philip's pulse amplitude modulation at a standard rate of 256 over sampling (256× 44.1 kHz) is a natural sampling technique for the invention in audio applications.

The difference ratio 51 that is input to the actual modification circuit 52 determines the scope and nature of the relationship between the input 10 and output 100 signals. The general concept is that there is an input signal 10 which has frequency related information, which input signal 10 further has some frequency and/or time ratio to the output signal 100, normally a ratio based on the times of expected signal production. If time is the determinant, the difference ratio is selected such that the output signal 100 when perceived has the same frequency related content as the input signal 10. Alternately the output signal 100 may have the same time as the input, but a different frequency or both may be varied simultaneously.

The difference ratio may be defined as the output frequency time product, divided by the input frequency time product. For example, suppose that the difference ratio is 0.855. If the input and output times are the same, then the output frequency is 0.855 the input frequency. If the input and output frequencies are the same, then the output time is 0.855 the input time. If the output frequency is 0.95 the input frequency, then the output time would be 0.9 the input time, since 0.95 multiplied by 0.9 equals 0.855.

The difference ratio 51 can be set manually or automatically. An example of the former would be having a technician dial in a factor representative of the input length and then a second factor representative of the output length. This type of manual setting would be particularly appropriate where the technician knew that a thirty (30) minute television program needed to be inserted into a twenty eight (28) minute time slot. As an example of the automatic setting, in television signals the horizontal sync pulses could be utilized to automatically decompress a tape recorded television movie. This type of automatic functioning would be particularly appropriate for signals having known, repetitive, determinable attributes or where the function of the circuitry can be readily determined (for example a profanity dump) and/or a known real time length and known time for actual presentation.

In the circuitry of FIGS. 8 and 22, the difference ratio is as previously defined. This ratio has been previously determined. Pitch shift may be obtained by sample insertion or deletion, if the input and output sample rates are the same. Alternatively, pitch shift may be obtained by using differing input and output sample rates, without sample insertion or deletion. Additionally, a combination of sample insertion/deletion and differing sample rates may be used. The sample rates preferably are at least greater than the Nyquist rate for both input and output. Over and above this, distortion considerations could require that the input signal be sampled at a rate much higher (for example 20 times) the highest input frequency in order to insure production of the output signal with minimal distortion. Note, however, that in non-critical applications the sampling rates can be much lower, particularly if the signals can be bandwidth limited while retaining acceptable information content (an example of this would be bandwidth limiting an audio signal to 5 kHz).

As shown in FIGS. 9–23, the modification circuit 52 selects at least one sample 22 from the digital sampled version 20 of the input signal 10 and generates a second plurality of digital samples 120 by altering the number of the digital sampled version 20 of the input signal 10 by the selected digital sample(s) 22. This can be by addition to expand (samples 122 in FIGS. 12 and 13) or by subtraction to compress (samples 27 in FIG. 19) as appropriate. The location of the added/deleted samples is selected in view of the signal content so as to minimize artifacts. For very high oversampling rates, the samples can be spread out over the entire alpha length of the signal. For lower oversampling rates, locations of least slope, least differences, signal peaks, or other minimal signal information points are preferred.

Note that FIGS. 9–21 are given by way of example. Other sampling/modification methods could also be utilized with the invention. Note also that for clarity of explanation in these figures that the input sample is converted to digital by a leading edge sample and hold circuit (left edge), while the output sample is converted to analog by a trailing edge conversion circuit (right edge). Alternate conversion circuits could be utilized if desired. For ease of comprehension, no interpolation is used in FIGS. 9–21.

The second plurality of digital samples 120 can be interpolated to reduce distortion caused by replication or deletion of the selected digital sample 22 if appropriate. A second digital converter 114 then generates an output signal 100 from the second plurality of digital samples 120 over the second duration of time 113 (again the inclusion of this convertor is dependent on the nature of the output signal). In the example shown, this produces a signal having substantially the same first frequency when clocked or reproduced at the new speed provided that the rate of occurrence of altered samples 22 relative to the input sample rate corresponds to the ratio between the first 13 and second 113 duration times. Compare the analog input signal 10 of FIG. 9 with the output analog signal 100 of FIG. 16, which output signal 100 is being produced during a different, shorter, length of time: In real time 80, the perceived frequencies or alpha length of the signals are the same. In this respect, it is noted that minor unobjectionable shifts could be accepted by the overseeing technician, this even though the pitch of the resultant signal is not absolutely accurate. Alternately the output may have a different frequency and same duration or a combination of different frequency and duration.

It should again be appreciated by those skilled in the art that either the digital converter 14 or the digital converter 114 may be optional in the event that either the input signal 10 or the output signal 100 is a digital signal of suitable signal content to allow for acceptable modification. Otherwise, oversampling would normally be appropriate.

The selected digital sample(s) 22 is added (FIG. 11) to the sampled version 20 of the input signal 10 to provide pitch correction to facilitate the prior or subsequent decrease of the duration time. The selected digital sample(s) 22 is removed (FIG. 19) from the sampled version 20 of the input signal 10 to provide pitch correction to facilitate the prior or subsequent increase of the duration time. This will be discussed more extensively later, especially with respect to FIGS. 22–24.

The signal modification circuit 50 adds or subtracts to the apparent alpha length of the input signal 10 according to the difference ratio in order to produce the output signal 100.

With present digital technology, this signal modification circuit 50 would begin with digital signals or a digital sampling replication 15 of an analog signal. This signal modification circuit 50 then repeats (to add or expand) or deletes (to subtract or compress) from these samples in order to alter the input signal 10 to an output signal 100 in accord with the set difference ratio. (Note again that a digital signal might, like an analog signal, have to be digitally over sampled to achieve acceptable distortion performance.)

A more sophisticated signal modification circuit 50 could average or linearly or otherwise interpolate the modified samples in order to optimize the functioning of the device in certain applications.

For example, a theoretical analysis of the spectrum resulting from applying a 5.6 percent expansion to a sine wave was performed. The sine wave period was 36 samples. The purpose of the analysis was to determine the relative distortion levels resulting from the insertion of samples at different phases of the input sine wave. Two samples per period were inserted. The type of linear interpolation used in the preferred embodiment is essentially the second order approximation method used for sample rate conversion. Proakis, John G., Rader, Charles M., Ling, Fuyun, and Nikias, Chrysostomos L., Advanced Digital Signal Processing, Macmillen, 1992. This particular interpolation operates along the entire signal, and weighs two adjacent samples in proportion to the distance from the last sample insertion. This type of interpolation gives exact (within quantification limits) output in the case of a linear ramp signal with constant slope (zero second difference). Three insertion points were examined: peaks, zero crossing, and 30° lagging from zero crossing. Insertion of samples at the zero crossing resulted in the lowest distortion of the three. Insertion of samples at the peaks was slightly inferior to the zero crossing. Insertion of samples at the 30° points resulted in the highest distortion. A feature of the zero crossing point of a sine wave is that it is the location of minimum second difference magnitude. A feature of the positive and negative peaks of a sine wave is that they are the location of minimum slope, or minimum first difference, magnitude. A feature of points on the sine wave which are removed from the peaks or zero crossings, such as the 30° phase point, is that neither the first or second difference is minimized.

Sample insertion at the peaks and at the zero crossings was also investigated for the case of no interpolation. In this case, insertion at the peaks gave lower distortion. Distortion performance in both cases was significantly worse than that obtained where interpolation was used.

It is envisioned that other interpolation algorithms may be advantageous from a performance standpoint. Examples of other algorithms would be polyphase subfiltering, higher order Lagrange polynomial interpolation, and finite impulse response low-pass filtering. In the case of expansion, it may also be advantageous for the added sample to be of some value other than the value of the immediately preceding sample.

Customarily, the signal modification circuit 50 would contain a delay length preferably of the variable type, the length of which must at least allow for the appropriate shifting of the signals to add or subtract whole cycles. Specifically, the maximum shift between the input signal 10 and the output signal 100 should be within the effective delay length of the available memory. Further, to provide for a smooth output signal 100, the present invention preferably uses a memory delay longer than this period in order to provide for a seamless operation.

The present invention accomplishes this with less than the amount of memory otherwise needed by comparing a first and second signal in order to reset the information in the memory (as later described) to add or delete blocks or cycles thus to provide for a seamless integration of the signals. In general, the more memory that is available, the more time can pass before the device is reset subject to an ascertainable artifact override. For complex audio signals, up to a point, the quicker the resetting; normally the less ascertainable the artifacts as will be described in more detail below. In addition, an even greater memory would allow an operator to delete or add blocks, cycles, or multiple cycles of signal information with no pitch change.

The delay could be a single memory if variable taps were available and the signal was actively followed through such variable taps by the signal modification circuit 50. Changing over between effectively two separate memory delay lengths 56, 57 is preferred, which delay lengths are each long enough to provide for the later described resetting, because of the way the design evolved. A single memory delay element was originally used. Later, a second memory delay element was added, since this was, at the time, the easiest way to accommodate the needed later described cross fade reset operation. At any given time, exclusive of reset operations, one memory circuit would be actively utilized in real time by the signal modification circuit, while the other memory preferably would continue to be updated with input signal data. An example of this is the two stretch cell embodiments set forth in FIGS. 26 and 27.

Figure 23:
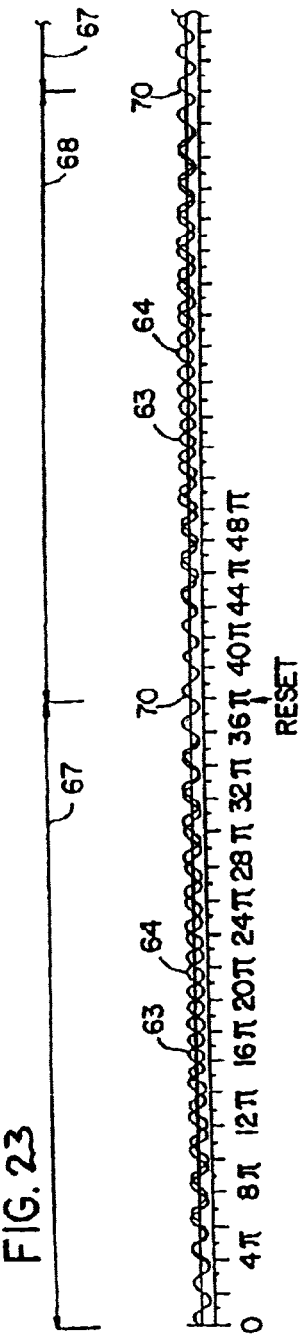
FIG. 23 is a graph comparing a first signal and a second signal and illustrating the reset of the phase angle of the signals at a common zero crossover.
Figure 26A:
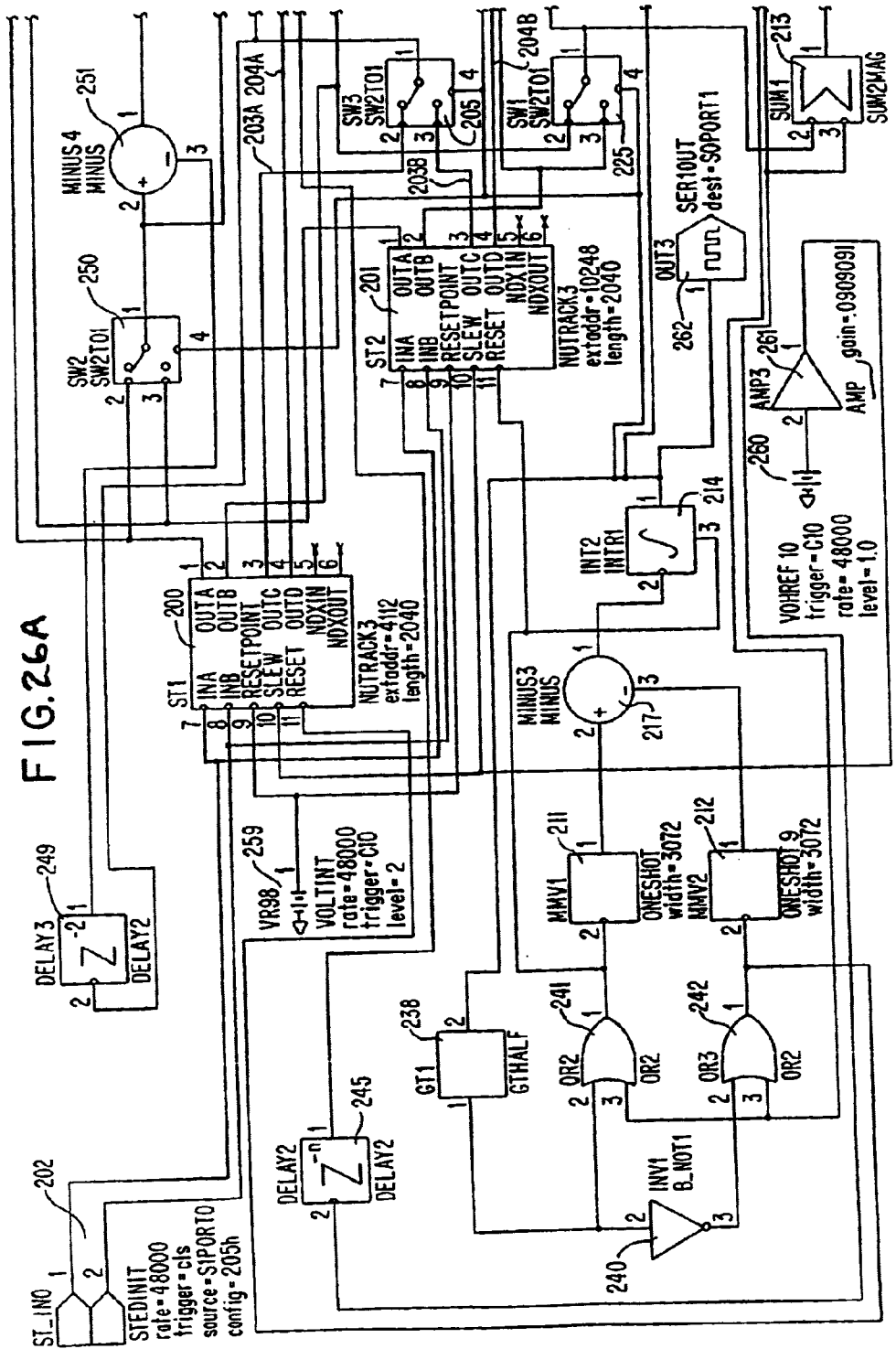
FIGS. 26–27 are circuit diagrams of example frequency converter systems.
Figure 26B:
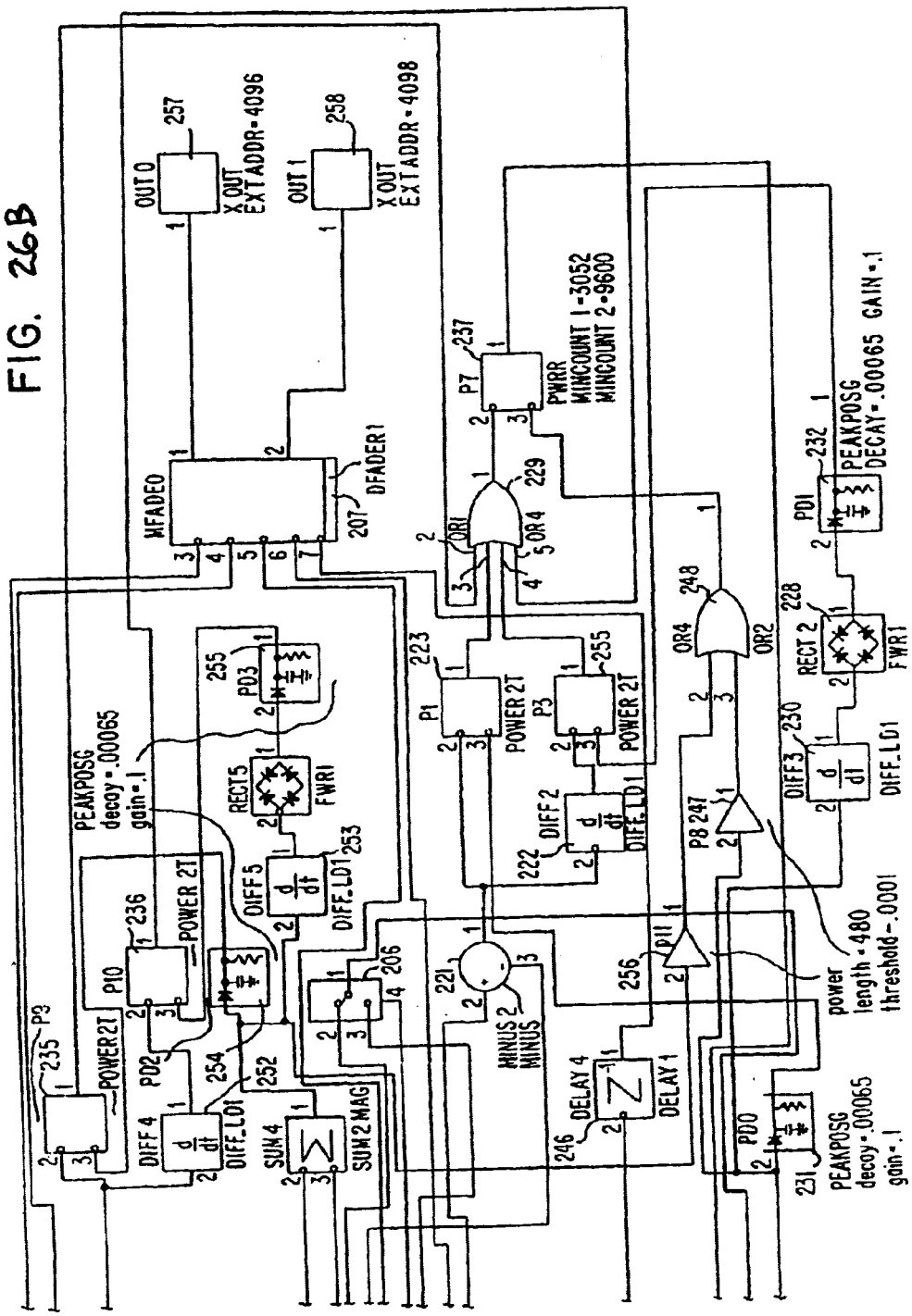
Figure 27A:
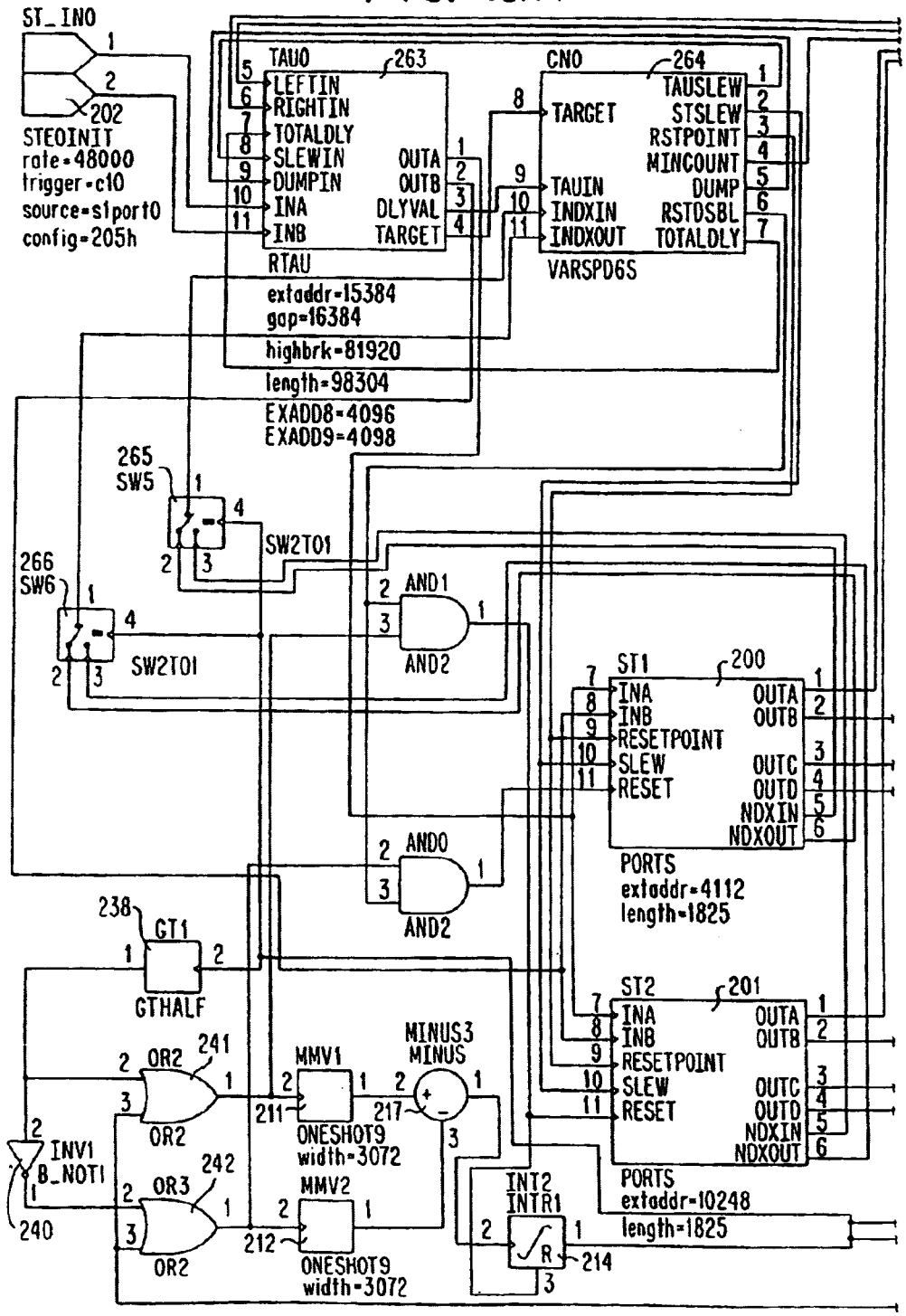
Figure 27B:
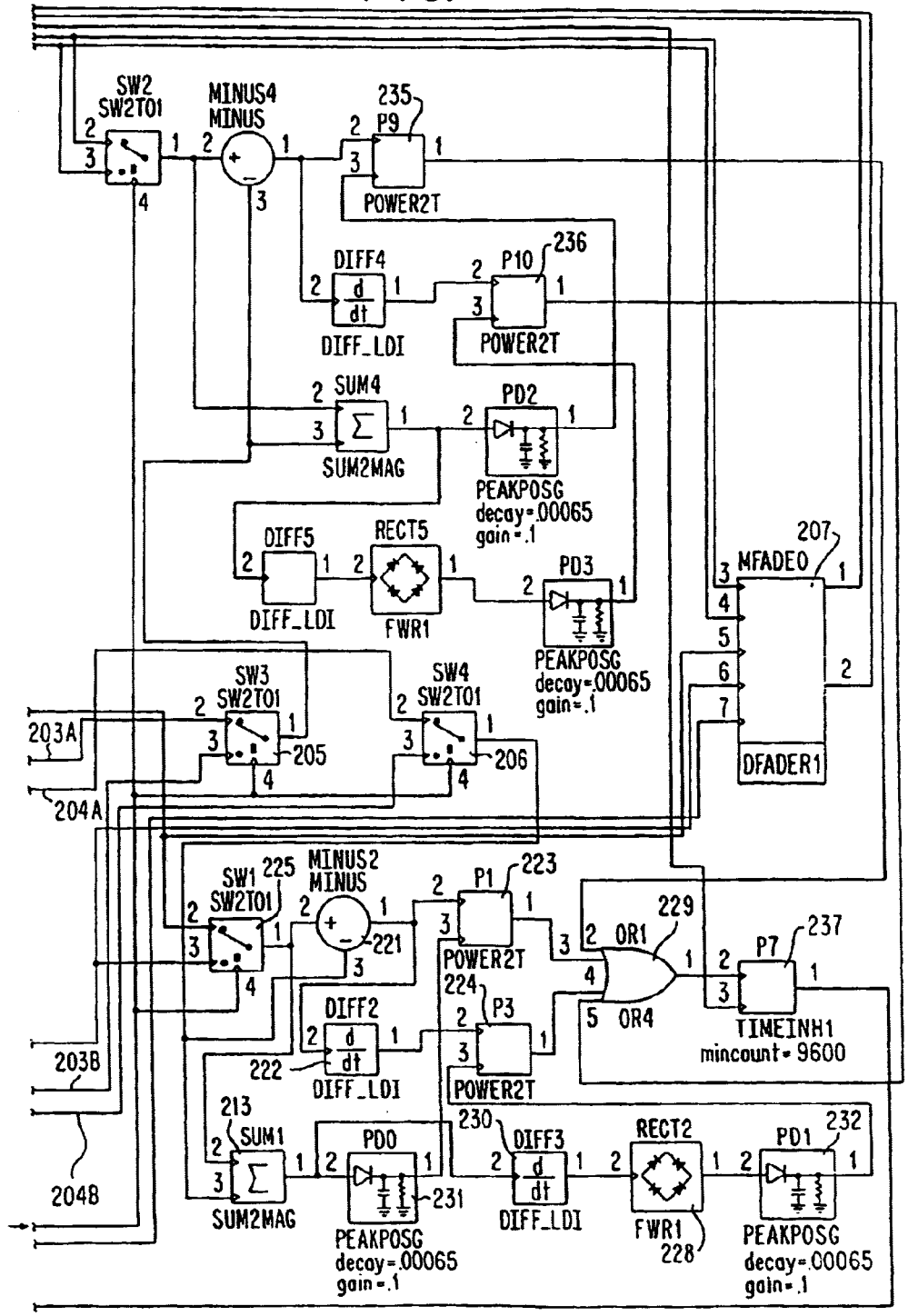
Figure 28:
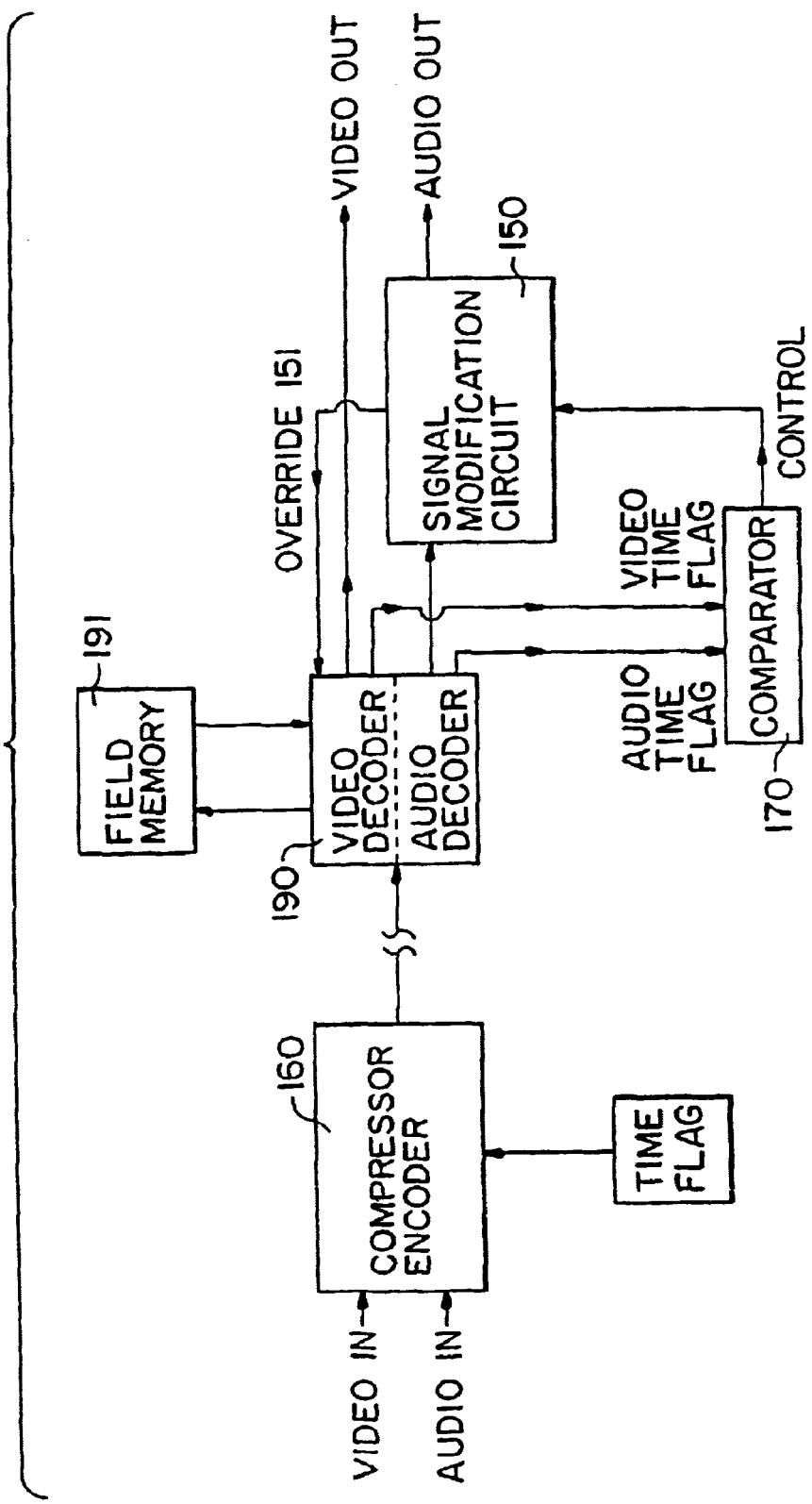
FIGS. 28–29 are block circuit diagrams of a MPEG implementation of the invention.

The circuitry of FIGS. 23 and 27–28 include two effective memory lines 56 and 57 together with two modification circuits 60 and 61. FIG. 23 utilizes two separate RAM memories while FIGS. 26 and 27 utilize a single RAM memory, with two different address spaces allocated respectively to two stretch cells to allow resetting.

The memory lines 56, 57 are preferably RAM memory circuits. These circuits provide for a delay necessary for the processing to occur. The length of these memory circuits is chosen in order to optimize the performance of the overall circuitry while at the same time preferably minimizing expense. The selection of length is normally a compromise between excessive delay versus the ascertainable artifacts which might occur during resetting at an earlier than appropriate time or resetting at too high a rate. In general, changing over more quickly reduces information loss. However, changing over too quickly results in unacceptable artifacts, so a compromise is chosen. Also, in general, optimization of performance is determinative of the preferable length for the memories 56, 57, even though theoretically an infinite memory length could be used. {Too long a delay can produce noticeable gap and/or echo effects. It also violates EIA/TIA-250-C.} Due to the use of two memory lines, and the changing therebetween (as later described), memory lengths of from 38 mS to 149 mS are more than sufficient for a normal audio signal. This memory is sufficiently long to allow for the smooth crossover between memories 56, 57 while at the same time storing sufficient samples so as to support the typically experienced maximum time between crossovers. Note that the length of the memory is a design choice. For example, there are frequent times of audio silence in a television talk show. If the memory was sufficiently long as a function of the expected length between silences in audio content, and the duration of the silence was at least as long as the section of memory to be traversed by the reset, the memory could be reset during these times of silence, thus not dumping or repeating any audio information. The length of memory required is the expected length between silences multiplied by the conversion factor. For example, for 0.4 seconds between silences at ten percent expansion or compression, 40 mS of memory is typically required. Further example in a symphony orchestra a memory technically long enough to work may produce artifacts due to too frequent resets. A longer memory accompanied by a reset prevention control would therefore be used, preferably delaying resetting to a time of silence or otherwise when least artifacts would occur. An additional example would be with television video content wherein there are frequent times of static images and/or screen changes. These can be located with a motion detector. By adding or deleting frames thus changing over video during these times, video artifacts are reduced to a minimum. Further, if the signals of any nature are compressed or expanded prior to signal modification and the sampling rate is high enough, and acceptable reset opportunities occur with sufficient frequency, conversion can occur with low average throughput delay. It is, therefore, important to recognize that the invention can be optimized for a given signal by slightly altering its specific implementation.

The modification circuits 60, 61 add or subtract samples to the signals contained within the memories 56, 57, respectively. This modification of the samples can occur while the samples are being fed into the memories 56, 57, while they are being removed from the memories, or otherwise.

As previously described, the rate of digital sampling is normally dependent on the complexity and frequency of the signals. In general, the more complex the signal and/or the more this conversion ratio is removed from unity, the more samples will be needed. The reason for this is that using too few samples in a complex, high frequency conversion will result in excessive distortion. For example with a 30 MHz computer square wave high/low input signal, three samples per clock period would be sufficient to slow the signal down to 20 MHz (see FIG. 16). However, with a 20 kHz audio signal, a sample rate much higher relative to signal frequency would be necessary to provide a 5 percent expansion without audible artifacts (see representative FIG. 17). This is because the information content of the computer signal is accurately conveyed solely by the on/off state. Thus the digital sampling rate must be carefully selected in view of the signals, both input 10 and output 100, as well as the difference ratio 51 to be encountered.

Changing over between the signal of the first memory 56 and the signal of the second memory 57 is accomplished by a reset control 65. When the reset control 65 operates, the signal modification circuit 50 changes over to the previously inactive memory circuit to remit the output signal 100. The other once active memory at the same time becomes disconnected from the output. The result is to increase or decrease the effective length of the overall memory.

Note, if samples are taken out of the memory more slowly than they are put in, the delay length will slowly increase to maximum. At maximum delay, there will be no available memory for the next sample to be put into. Conversely, if samples are taken out faster than put in, the delay will shorten to nothing. At zero delay, there will be no stored sample to be taken out. It thus is desired to reset the memories before they are full or empty respectively, and preferably so that whole cycles of signal are added or deleted. By resetting or changing over memories, a portion of the signal will be repeated, preferably an integral signal, or a portion of the signal will be lost, again preferably an integral cycle. The net gain in either case, however, is to vastly increase the amount of apparent memory.

The reset control 65 operates by comparing two signals in order to determine their similarity, with the changing over between the signals in memory occurring based on this similarity. The purpose of the reset control 65 is to maintain the overall throughput delay within acceptable limits. The signals being compared typically should include a delayed signal and another signal, which may itself be also delayed or not. For example, in a compression circuit, samples are being removed and a signal is effectively output from memory faster than it is being input. For this reason, the reset point could be at maximum delay or at the end of the memory. A delayed signal at this point is then compared to the relatively undelayed signal that is being used by the modification circuit for changeover to maximum delay. However, in an expansion circuit, samples are being added and a signal is effectively output from memory more slowly than it is being input. For this reason, the reset point could be at minimum delay, or at the beginning of the memory. A relatively undelayed signal at this point (which could even be the input signal) is then compared to a relatively delayed signal that is being used by the modification circuit for changeover to minimum delay. As an additional example, the reset control 65 could be a computer that has as a signal feed of only the input signal, which the computer compares with time shifted versions of such signal to operate this reset control 65 through analytical analysis, essentially comparing two versions of the single input signal for similarity; this with no other direct connection to any signal modification circuit signal input or output. As a further example, the reset control could be a computer that compares a plurality of signals over a range at one end of a memory with a second plurality of signals over a range at the other end of a memory, with the reset occurring between the two most similar signals. In this device, the signals being compared would be developed from an analysis of a plurality of signals. While the resulting reset might not produce the maximum amount of available memory (i.e., be to the end of the memory), complex signals would be effectively processed. Therefore, depending on circuit design, the signals compared for similarity may vary from that disclosed herein. The key is that the signals have a statistical probability of being similar and are representative of signals displaced from each other in the memory. For example, the reset control could compare: a) the signal at the output of one memory 56, 57 to the input of the other memory 56, 57; b) the output 100 to the input 10; or, c) otherwise as desired or appropriate. In the preferred expansion embodiment of this specification, the input signal and output from the active memory are compared. In the preferred compression embodiment, the output from the active memory and the signal delayed relative to this output are compared.

The reset control 65 in ascertaining similarity, preferably, compares the signals for: a) relative slope between signals; and, b) relative amplitude between signals. These are compared to preset thresholds. Signals meeting the criteria of low relative slope and amplitude include periods of no information (i.e., silence in audio). Video signals could be compared for scene change points for the addition/deletion of frames in a video image in an alternative embodiment. Video signals could also be compared for static video images, in an alternative embodiment.

The Algorithms used to extract signal comparison information must be selected consistent with the type of coding used. It is preferred that the compared signals be examined for similarity in as many characteristics as practical. For example, the use of zero crossover in a similar direction alone in a reset control could produce an artifact if one signal was a high frequency signal at that point while the other was a low frequency signal. Similarly, least relative slope alone could cause unacceptable artifacts to critical listeners of an orchestra if resetting occurs more rapidly than is absolutely necessary. Look forward and look back comparisons would thus preferably be utilized in the reset control 65 so as to optimize the overall comparison with time displaced information as well as current signal status. Further, the reset control 65 would preferably include an override in response to these overall comparisons in order to limit unneeded resets, thus optimizing the comparison procedure. In general, the more comparison attributes are included, the better the operation of the reset control 65.

The reset function is often accompanied by a repeat of signal (pitch increase mode; samples removed) or discard of signal (pitch decrease mode; samples added).

Using an example memory device that is capable of both modes (FIG. 31) with two parallel memory lines 56, 57 and two signal modification circuits 60, 61, the reason for this signal repeat/deletion can be readily understood. In this device, an input signal 10 is being continually fed into the beginning of two RAM memory lines 56, 57.

In the pitch increase mode A, the active signal modification circuit (60 shown) uses signal data at a somewhat faster rate than it is being fed into the memory line 56 (the actual rate dependent on the expansion ratio). This causes the active signal modification circuit 60 to relatively advance up the memory line 56. While this is occurring, the reset control 65 is examining two signals for similarity. In the embodiment shown, the signal being output by the active signal modification circuit 60 and the signal at the circuits reset position are compared (as depicted by dotted lines in all figures). When the signals are similar (or when the active memory line 56 is used up), a reset occurs. This causes the other memory line 57 to return to the relative reset point and other modification circuit 61 to become active. However, since the input signal 10 has been continually fed into both memory lines 56, 57, this reset causes a certain portion 58 of the input signal 10 to be processed for a second time repeating this data at the output of the signal modification circuit 50. As the input signal 10 is periodic, and an integral number of signal periods is repeated, the artifact is acceptable. For example, as shown in the FIGS. 23–25, the actual repeat would normally be one or more complete cycle of the input signal. The actual reset would repeat only a fraction of the actual signal content. In fact, this fraction is typically equal to the compression factor.

In the pitch decrease mode B, the active signal modification circuit (60 shown) uses signal data at a slower rate than it is being fed into the memory line 56. This causes the active signal modification circuit 60 to relatively retreat down the memory line 56. While this is occurring, again the reset control 65 is examining two signals for similarity. In the embodiment shown; the signal being utilized by the active signal modification circuit 60 and the signal at the circuits reset or input position (dotted lines in all figures) are compared. When the signals are similar (or when the active memory line 56 is used up), a reset occurs. This causes the other memory line 57 and other modification circuit 61 to become active. However, since the input signal 10 has been continually fed into both memory lines 56, 57, the reset causes a certain portion 59 of the input signal 10 to be never processed, thus deleting this data from the output of the signal modification circuit 50. Again, as the input signal is Periodic, and an integral number of periods is deleted, the artifact is acceptable, especially given the ways described herein of reducing its noticeability.

Note this example uses two memory lines 56, 57 and two modification circuits 60, 61 with a single sample rate for clarity of explanation. In other embodiments, the memory lines 56, 57 could be combined, a single modification circuit could be utilized, only increase or decrease, or both increase and decrease, could be provided in a single circuit, the processing could occur in real time for pitch shifting and other signals could be compared for reset control. Further, the signals in memory could be clocked out at higher or slower rates than being input, thus providing the alteration of the alpha length of the input signal without movement of the signals to the modification circuits (which in both compress and contract could be located at the end of two individually differing clocked memory lines). Examples of these and other embodiments are given here and elsewhere in this application.

The resetting increases or decreases the effective length of the overall memory with acceptable artifacts by changing over between effective memories as previously described.

In the preferred embodiment, when the chosen parameter (s) are similar, the reset control 65 changes over between the relative memories 56, 57 as described. In addition, the previously inactive memory 56, 57 is reset at the time of changeover, thus extending its relative length.

Note that if there are multiple related channels, such as stereo audio or surround sound, this switchover preferably occurs when all important channels are similar at the same time, thus minimizing perceived stereo or spatial phase shift. This reduces the loss of stereo or spatial imaging. This correlation is preferably occasioned by logically connecting each channel associated reset control 66 to the reset control 65 for cooperative signals in order to provide for comparisons of their respective signals similarity.

In addition, in a possible alternative embodiment, if the reset control 65 has not operated near to either end of an operative total memory length, changing over is forced; preferably based on some sort of optimization formula (ideally computerized). This preferable forcing recognizes that a particular memory length may run out of its ability to compensate for the delay between the compared signals prior to the compared signals being similar (as previously set forth), and thus might produce annoying artifacts. Note also that if there are multiple channels (for example again stereo audio), the signals might be forced independently according to individual parameters. One example of this would be if one channel had high frequency (such as a fife), and the other channel had low frequency (such as drums). The optimum forcing times for each respective channel might not be coincidental. In this particular example, the low channel might be forced at a different time from the high channel: if the channels were forced simultaneously, there could be high frequency cancellation and/or loss of imaging. It is therefore appropriate for the forcing to be under the control of some logic specifically designed for the nature of the signals. For example with off/on computer signals, the two channels could be forced independently: Each according to its own parameters. However, for a stereo audio system or for an audio signal synchronized with a video image, care must be taken not to destroy the imaging and/or synchronization. The channels must therefore be correlated to insure that this does not happen.

The circuitry in FIGS. 22 and 26–27 have a reset control 65 which compares the intermediate signals in the modification circuits 60, 61 for similarity with the reset control 65 operating a cross fade control 70 to change over between modification circuits 60, 61. Note if the length of the delay in the memories 56, 57 was appropriately extended, the changing over could be artificially manipulated including to allow for the deletion or insertion of blocks of information while also reducing the artifacts to a minimal amount. As an example of this, in talk show profanity memories, it would be possible to change over to the inactive memory at the immediate end of the time of the profanity, thus in effect resetting the profanity memory without any additional loss of signal. As an additional example, a documentary could add to or delete audio independently of the video content by increasing or decreasing audio delay without introducing an annoying pitch change. Further, if there is a correlation between two signals, the use of the invention would allow one to independently resync the signal's correlation without introducing objectionable artifacts.

An example of how the input 10 and output 100 signals may correlate will now be described in example form. In the embodiment of the invention now specifically described, the input 10 and output 100 will be analog signals with frequency shifting alone occurring.

The input signal 10 is a signal stored for production over a first length of time. This input signal 10 has frequency related information thereon. An example would be a television or audio signal from a video cassette recorder or other storage means. A simplified stylistic version of this input signal 10 is shown in FIG. 9 (in the actual signal, a more complex waveform would normally occur; see FIG. 12 for example). For reasons not particularly important to this example, it is desired to extend this example signal by substantially 5.6 percent without altering the apparent frequency content thereon.

Note that FIGS. 9–21 are given by way of example. Other sampling/modification methods could also be utilized with the invention. Note also that for clarity of explanation in these figures that the input sample is converted to digital by a leading edge sample and hold circuit (left edge), while the output sample is converted to analog by a trailing edge conversion circuit (right edge). Alternate conversion circuits could be utilized if desired. For ease of comprehension, no interpolation is used in FIGS. 9–21.

Figure 25:
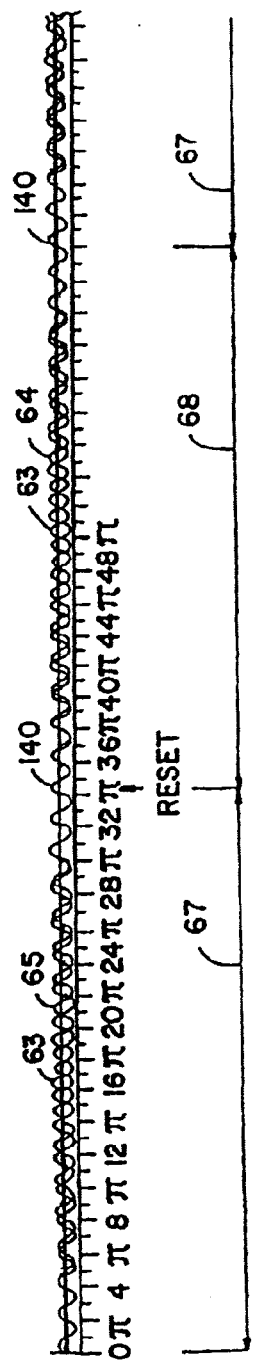
FIG. 25 is a figure like FIG. 23 illustrating a reset at the top of a signal waveform.

The first step of this example is to replicate the input signal 10 of FIG. 9 into digital form. In the devices of FIGS. 22 and 25 this is accomplished by a pulse amplitude analog to digital converter 14. An example of this digital sampled signal is shown in FIG. 10. (Although pulse amplitude modulation is shown for this digital example, it is to be understood that other coding methods could be utilized without deviating from the claimed invention. Examples include PWM, PEM, PDM, PCM, PPM, PNM, PFM, PLM, and PIM.

In this FIG. 10, the analog signal 10 has been replicated into digital form 20 through the use of PAM, specifically thirty six (36) digital samples 21, each having an amplitude. In that the input signal 10 is to be compressed by 5.6 percent, this 5.6 percent is the equivalent of two samples of our example digital wave 20 of FIG. 5 (it is necessary then to add two digital samples 22 to the input signal 10 in order to frequency compensate such signal). This exemplifies the fact that in the preferred embodiment the sampling rate preferably must be high enough so as to allow the insertion (or deletion) of a sample 21 in the replication of the output signal 100, without introducing unacceptable distortion.

In general, the higher the sampling rate, the less distortion will be introduced by the frequency conversion process. This is particularly true in respect to the frequencies where the consumer is most sensitive. In addition, it is preferred that the samples 20 be inserted (or deleted) where any artifacts would be least noticeable. In the case of a significant expansion (or contraction), the samples would preferably be spread out over the entire length of the wave form (see FIG. 12 for a representative complex wave form).

Our example signal is a sine wave with the samples added at the point of least slope; the peaks 23 of the positive wave and negative wave, respectively. Therefore, needing only two samples, at these two points the signal modification circuit 50 inserts an additional sample 24 in both the positive and negative series of digital samples 21. This produces the modified digital signal 25 of FIG. 12. A modified signal without highlighting is shown in FIG. 13, now representative of the sampling 120 of the output signal 100. Note that FIG. 7 has a peak sample repeated.

When the compressed digital representation of the signal 120 in FIG. 12 is taken through a digital to analog converter 114, the result is the signal shown in FIG. 14, an output signal 100 having an effective alpha length 113 some 5.6 percent longer than the input signal 10 shown in FIG. 4. The difference between the two signals 10, 100 is shown in FIG. 15.

Due to this difference, the output signal 100 can be played back at a clock rate some 5.6 percent higher than the input signal 10 in FIG. 9 while at the same time producing a signal having the same frequency content to the observer as existed in the input signal 10. (Compare FIG. 9, i.e., the input signal 10, with FIG. 16 wherein the output signal 100 is clocked at a rate 5.6 percent higher than FIG. 9: The two signals produce the same frequency content.) This would allow a television station to shorten the time of a television program accordingly without increasing the pitch of the related audio information.

It should be noted that in this example the compression/expansion factor is equal to the inverse of the number of samples between peaks. In the more general case, where such a simple relationship did not exist between waveform period and pitch shift factor, it typically would not necessarily be possible to arbitrarily select the more favorable points for sample insertion or deletion.

It should also be noted that in cases of types of coding differing from the PAM of this example, differing sample modification algorithms may be required.

The difference between our example input 10 and output signal 100 is some 5.6 percent. However, any difference, including this 5.6 percent, is cumulative for each cycle of the input signal 10. For this reason, the memory necessary to perform the function of modifying the input signal 10 into the output signal 100 can be computed by multiplying the number of repetitive cycles by the difference time factor, by 5.6 percent in our example. This adds up very quickly to a significant amount, an amount requiring ever increasing memory.

To avoid this, the applicants invention uses the reset control 65 to change over between effective memory points in the signal modification circuit 50 so as to reuse the same effective memory repeated times.

This reset control circuit 65 operates when the two signals being compared are similar within prescribed parameters as previously set forth. It then changes over between similar signals. An example of the comparison can be seen in FIG. 17. This figure represents a circuit adding samples to a first analog signal 63 to produce a second, expanded analog signal 64. In this figure, after 38 cycles, the first analog signal 63 and the second analog signal 64 both have a positive going similar slope, same direction, zero crossings at the same location 70. If one immediately reset the signals, and began the cycle anew at this time, an individual to whom the signal 100 was addressed would not notice any significant artifacts. For this reason, the switchover could compensate for the increasing phase lag between the signals with memory having a finite length. The cost of this in FIG. 23 is the loss of one cycle of the first analog signal 63, which one cycle would never be produced to be perceived by the individual.

As previously set forth this resetting is most easily accomplished by changing over between two memory lines 56, 57 accompanied by a resetting of the second memory line (as was further described in respect to FIG. 22). While this compromises the input signal 10 information, this resetting significantly reduces the amount of memory necessary for the device to operate. More importantly, even if infinite memory were available, resetting must still be done. Otherwise, the desired effect of time compression or expansion would be completely canceled. As an example of this, memory line 56 would be utilized for the time 67 with memory line 57 utilized for the time 68 to produce the output 64.

Figure 24:
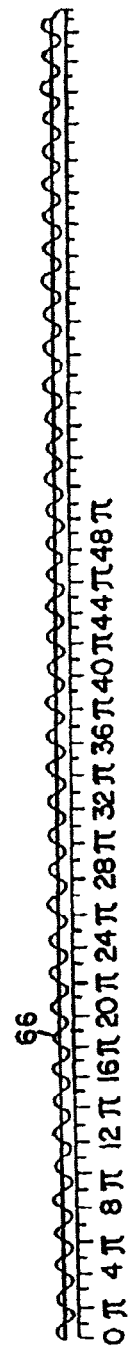
FIG. 24 is a graph of the constant, non-reset first signal in FIGS. 23 and 25.

FIG. 24 represents a circuit deleting samples of a first analog signal 63 to produce a second compressed analog signal 65. This figure is a graph comparing the first analog signal 63 and the second analog signal 65 and illustrating the reset 140 of the signals at a common amplitude, similar frequency signal peak. At this time, again one would change over between the two memory lines 56, 57 and simultaneously reset the second memory line. This has the effect of adding to the output 100 by repeating one cycle of the input signal 10 information, again a resetting significantly reducing the amount of memory necessary to operate unnoticeably as well as maintaining through delay within acceptable limits. Again the two memory lines 56, 57 would preferably be utilized alternately to produce the output 64 without seams.

Figure 29:
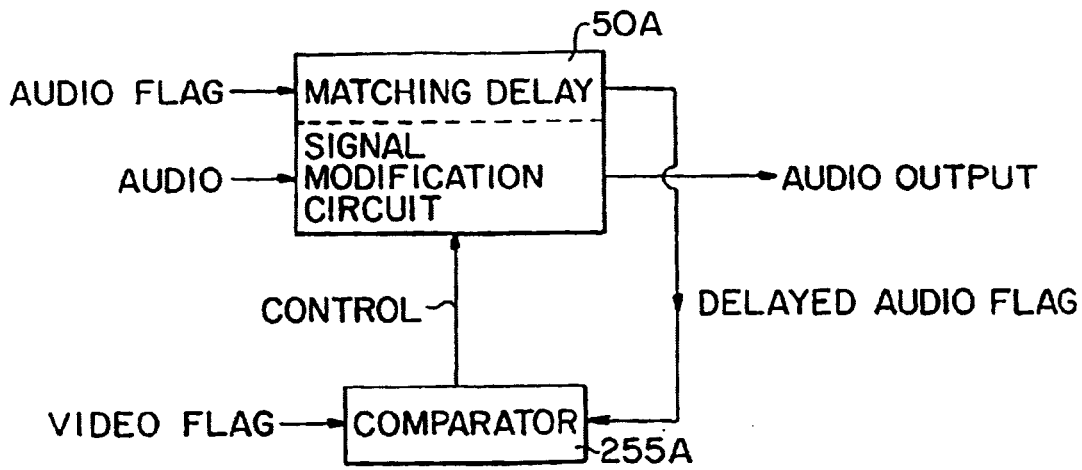

The invention finds particular application in MPEG audio and video compression (FIGS. 28–29). In the MPEG system, there is a considerable amount of video processing which goes on which is dependent upon the complexity of the video image which is compressed and/or decompressed. This is also true for the various audio signals which accompany the video. Due to the differences in compression complexity, there is frequently a corresponding variable delay interval in compression and/or decompression time which causes missynchronization of the audio and video signals when they are ultimately decompressed for use, as for example by receipt of an MPEG compressed HDTV television signal by a viewer.

In order to attempt to overcome the audio to video asynchrony problem, the MPEG compression standard provides for encoding a unique number in the compressed audio and video data stream every 0.7 seconds or so at the time of compression. Upon subsequent decompression, these numbers are presented to the audio and video system decoders in order to facilitate a comparison of the audio number to the video number in order to allow the two to be brought back into relative synchrony at these periodic times by manipulating the video via video frame memories. This still, however, can produce ascertainable artifacts tiring or objectionable to the observer. Further, multiple frame video memory buffers are necessary to allow the needed frame comparisons to repeat or drop identical frames. This memory is expensive and the processing complex.

The above missynchronization of the audio and video signals of a particular entertainment program can be a serious problem, especially when the audio leads the video, as this is an unnatural condition and leads to conscious or unconscious stress in the viewer. This is an unfortunate byproduct of the MPEG compression. The unnatural audio leading and/or trailing video condition is also known to diminish the viewer's perception of the quality, for example the entertainment value of the program being viewed.

The present invention can be utilized to resynchronize the signals, thus eliminating the tiring and objectionable artifacts. Further, the multiple frame video delay and complex comparisons of the MPEG standards are not needed even though better synchronization is achieved. The invention accomplishes this by effectively speeding up or slowing down the audio signal(s) to synchronize it to the video, and does so without any pitch change.

The invention preferably utilizes the automatic reference signals to accomplish this synchronization. The two preferred reference signals which are encoded at the time of MPEG compression are SCR (System Clock Reference) and PTS (Presentation Time Stamps), the details of which may be found in the MPEG specification standards published by ISO/IEC. Other compression standards suffer from the same problems and may make use of these or similar SCR or PTS type schemes, which will be referred to collectively here as time flags.

The encoded time flags thus represent the starting time at which a particular video frame and its associated audio signal(s) arrive at the encoder, and/or are to be played back together from the decoder.

In this example MPEG system as it presently exists, if the video decoder sees that the video frame it is about to play back has a code which is later than that is, occurred after, the audio which is currently being played back, a frame of the video is repeated to bring the two close to synchrony. If the video frame is before the audio which is currently being played back, a frame is discarded. Such action, which is suggested by the MPEG standard, finds only limited capability in preventing audio to video asynchrony. Further, there are other problems with the frame drop/frame repeat method of achieving synchronization. First, adjustments may be made only in one frame increments, giving rise to potential residual errors. Also, the required video memory is costly compared to an equivalent amount of audio memory. Further, it may be that it is needed to discard a frame of video to synchronize signals, but the full frame might not yet have arrived due to complex decoding requirements. More than one frame of adjustment might also be needed, giving rise to the need for even more video memory with the associated cost problems. Since adjustment is made in frame jumps, this can also cause motion related artifacts, and, if the relative delay is constantly changing, the system can alternately repeat and delete frames of video causing an artifact known as motion judder (jitter+shudder). Further, the missynchronization that does exist could cause subconscious or even conscious ascertainable artifacts, reducing the viewer's enjoyment.

The invention of this application can be utilized in conjunction with a continuously variable audio delay to provide a better audio to video synchronization than in the present MPEG frame drop/frame repeat standard. Further, this is achieved at a lower cost. The invention preferably accomplishes this by adding samples to the audio to allow the audio to be slowed down to re-synchronize the signals (in the instance of advanced audio), or deleting samples to allow the audio to be sped up to re-synchronize the signals (in the instance of delayed audio). The signal modification circuit may be used by itself or in conjunction with a frame drop/frame repeat device.

The video signal to be output from the receiver's video decoder precedes the audio. This delay allows the processing of the video signal to synchronize the eventual audio signal output with the video signal. (The resulting correspondingly advanced audio is delayed in the receiver to allow synchronization to be achieved.) As previously discussed, this synchronization is accomplished in the MPEG standard by dropping or repeating video frames.

In the device of FIG. 28 incorporating the present invention, the MPEG input signals are fed from the normal compressor encoder circuits 160 in the customary mode of transmission (tape, transmitter, receiver; cable, etc.) to a modified adaptive decoder 190. The adaptive decoder 190 shown is modified from a customary MPEG adaptive decoder in that the adaptive decoder 190 has only slightly over a single field of video memory 191, and the use of this optional memory is to allow for an unusual override reset of the signal modification circuit 150 (as later described). (In contrast, the customary MPEG demodulator has at least two frames of memory, which memory is actively used for audio resynchronization.)

The video signal in this modified device is directed through the adaptive decoder 190 to produce an output video signal in the customary manner according to with MPEG standards, except that it trails the audio signal by approximately two frames (this due to the deletion of the audio to video synchronization from the video signal path).

The audio input signals 10 are fed through the adaptive decoder 190 to convert such signals to customary form. The audio input signals 10 are, however, then passed through a signal modification circuit 150 in order to add or subtract samples to synchronize the audio to the video signals. This synchronization is accomplished by adding or deleting samples in the audio input signal 10 according to the invention. Thus, as the relative delays of audio and video change, the audio delay time may be adjusted, without pitch changes, to enable proper synchronization with the video. This is preferred in that it occurs at a much lower hardware/software cost than a video memory or memory system would produce. This would normally be an intermittent procedure accomplished after relative synchronization was lost, typically during times of major video changes. The relative video delay allows resynchronization without the introduction of objectionable artifacts. For example, the unique number transmitted every 0.7 seconds in the MPEG system could provide a reference for automatic synchronization by altering the signal modification circuit 150 to add or subtract samples as needed under the control of the interface comparing logic 170:

The control of the audio delay may be either a feed forward (FIG. 28) or a feed back arrangement (FIG. 29).

In the feed forward configuration, the time flags of the video and audio which are output from their respective decoders are compared to determine the amount of delay which the audio needs to achieve synchronization with the video. This delay is coupled to the audio delay control to cause it to change to the desired amount. In this application, the audio and video signals are fed through a compression encoder 250 subject to the time flag 251 in the customary manner. However, on decompression while the video signal 10 is fed through a customary rate convertor 253, the audio signal 10 is fed through the signal modification circuit 50 to resynchronize the signals. A comparator 255 analyzes the video flag and audio flag to automatically control the sample addition/deletion of the modification circuit 50.

In the feed back configuration, the time flags of the audio output from its decoder are delayed by the same amount as the audio is delayed in the variable memory. The audio time flag and audio may of course be delayed in the same, or separate matching memories. The video time flag corresponding to the output from the variable memory is compared to determine the amount of synchronization error of the audio relative to the video. This error is coupled to the audio delay control to cause it to change to correct the error. In this application, the audio signal 10 is fed to a modified signal modification circuit 50A, a circuit that actively acts on the audio flag in addition to the audio signal 10. The comparator 255A then compares this delayed audio flag to the video flag in order to control the signal modification circuit 50A to resynchronize the audio output to the video.

In this resynchronization, however, as previously described in respect to FIGS. 17–19, there is a possibility that very occasionally the reset control 65 in the signal modification circuit 50 might not have operated near to the end of an operative total delay length. In FIG. 23, when this would occur, the field memory would preferably be operated in order to repeat a field, and thus allow for the forced resetting of the signal modification circuit 50. In the embodiment shown, this is provided by an override signal 151 from the signal modification circuit 150 to the video decoder.

Figure 30:
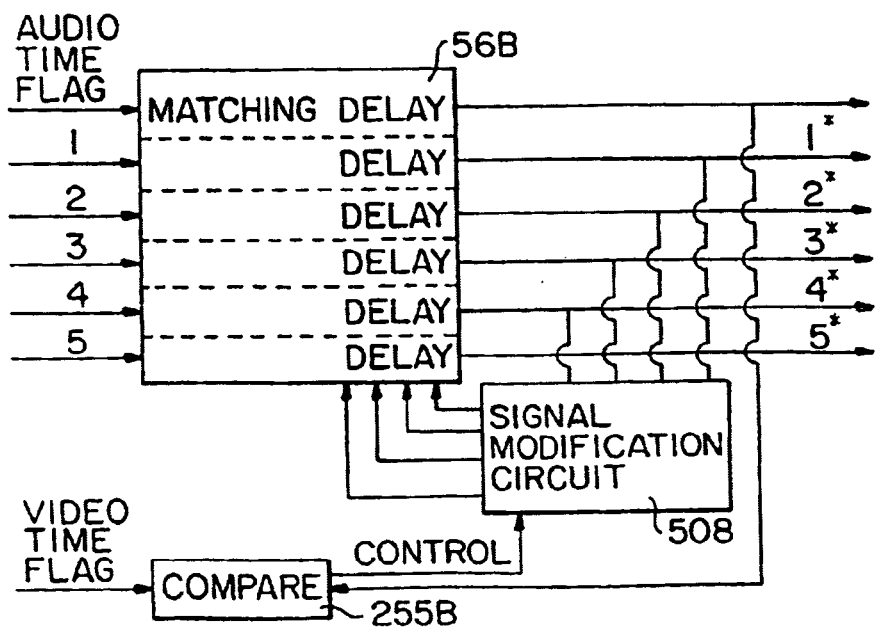
FIG. 30 is a block circuit diagram of a multiple channel device.
Figure 32B:
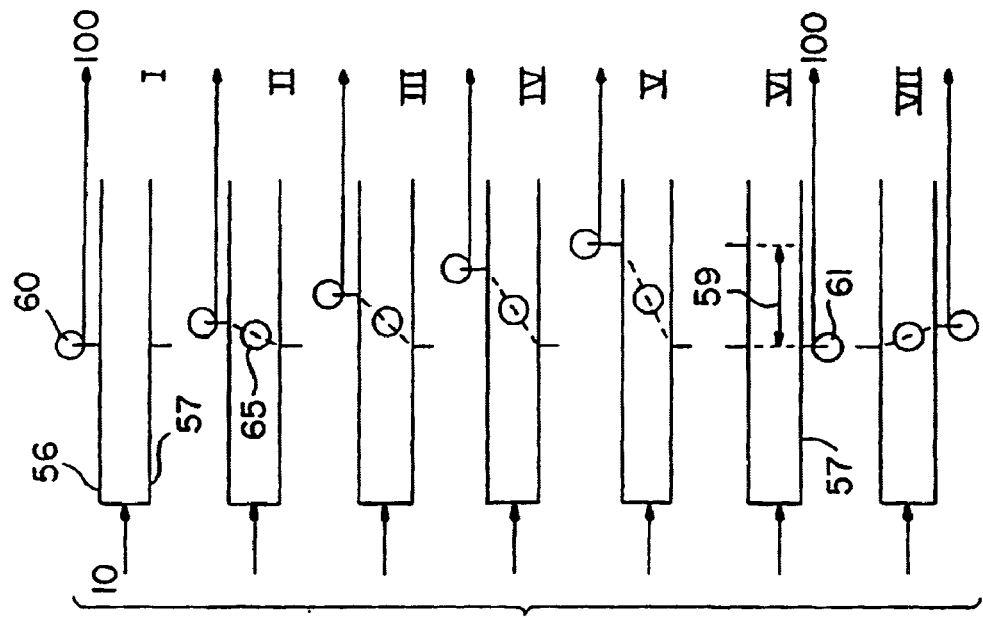
FIG. 32 is a series of representational block diagrams setting forth an example resetting of memory lines in an expansion or contraction frequency conversion device; and, FIG. 33 shows an adaptive filter network for incorporation into the system of FIG. 31.
Figure 32A:
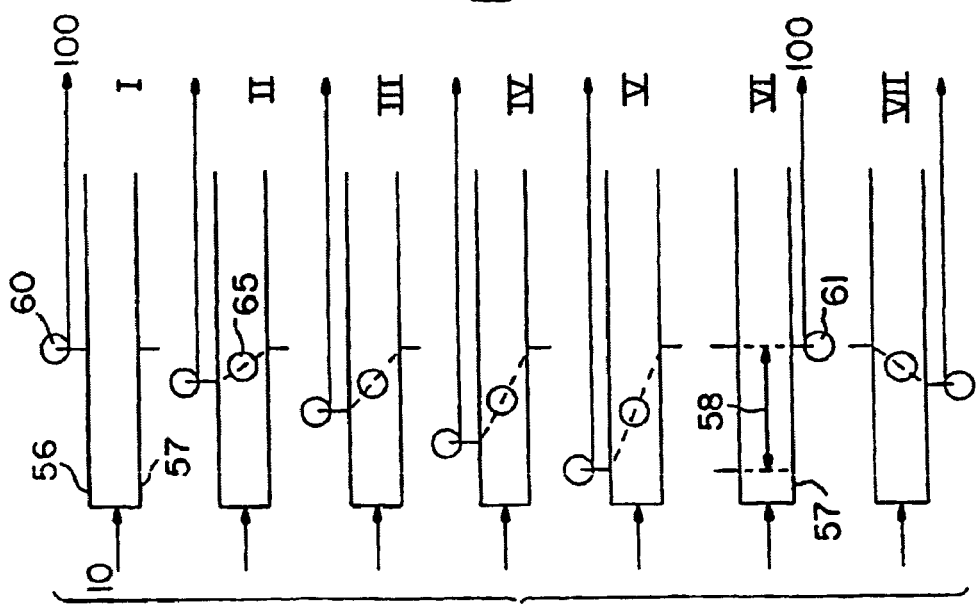

As a further improvement, it will be advantageous to either compare time flags of multiple sound channels of a given audio signal in order to correct any channel to channel phasing and polarity errors which may exist (FIG. 30). One example of such a system would be video surround sound audio having 5 channels corresponding to left front, right front, left rear, right rear, and subwoofer. The channels would be compared to each other to ensure that their relative phasing or timing are kept correct, with any timing errors being used to control fine phase adjustment of each controlled audio channel. In this application, the various channels 1–5 would each be subject to its own individual delay in the delay circuit 56B, with samples added or subtracted therefrom based on a signal modification circuit 50B. This circuit 50B and the delays are automatically adjusted by the flag comparison circuit 255B. Feed forward could also be utilized.

The control of multiple sound channel timing for any multiple sound channel application may be implemented by itself with the variable delay capability of the present invention. This is especially true because of the precise delay control which may be achieved in the present invention. Multiple sound channel timing control is, however, quite cost effective. Further, it is very useful to include such correction as an additional capability of audio to video synchronization circuitry. Another invention showing correlation of multiple audio channels for applications where audio and video are transmitted over different paths is shown in Cooper U.S. Pat. No. 4,703,355 which is incorporated herein by reference with respect to its prior art teachings and in particular, signal correlation and generation of control signals responsive thereto.

The invention may be utilized in an entertainment or other system to provide faster or slower than normal recording or replay of audio, and if desired associated video. Other information may be utilized as well, with the teachings herein being just as applicable to storage or replay of any information having a frequency parameter where it is desired to alter the time duration without altering the frequency.

FIG. 31 shows a system in which a physical storage medium 300 along with its associated scanning mechanism is controlled by the user by providing a varying reference to the scanning mechanism. It is preferred that the physical storage medium be a digital video disk such as a common optical CD device which utilizes a spindle motor to rotate the storage medium, which is the disk, and a laser and optical scanning head which make up the scanning mechanism. It is preferred to provide the servo mechanism for the spindle motor with a variable frequency reference signal which is provided by a Numerically Controlled Oscillator (N.C.O.) 305 which frequency is controlled by the user interface and control logic 310.

The user interface and control logic 310 also interactively controls the optical scanning head position, receiving positional data from the scanning mechanism (which alternatively may be provided via the recorded data) to perform start, stop, record, play, search and other functions normally provided. In this manner the recording or playback of the audio and/or video data may be controlled to take place at different and variable rates. It should be noted that while the term data is used to denote what is stored in the storage medium, that it is not to be construed that this data is to be limited to digital data. Data as used herein is simply meant to mean the information which is stored in whatever form it may exist.

While this embodiment of the invention is preferred to be a CD device, one skilled in the art will recognize from the teachings herein that any storage device may be adapted to implement the invention, including analog video disk recorders, analog audio tape recorders, DAT recorders, video optical disc recorders, video tape recorders, rotating magnetic disk recorders (such as computer disk drives), film based recorders and projectors, solid state memory including semiconductor memories, charged coupled device memories, switched capacitor recorders, and three dimensional solid memories such as laser addressed crystal lattices. All of these storage device types have in common a mechanical, electronic, optical or combination scanning mechanism which selects where within the physical storage medium the data is stored or read. It is by controlling the rate at which this scanning mechanism operates that the rate of storage or reading is made variable. The invention may be utilized with record only, playback only or record and playback versions.

As one skilled in the art will understand from these teachings, varying the rate of reading or writing may not be successful over a very large range by simply causing the scanning mechanism to operate at different rates. In virtually all storage devices, the data is stored in a form which takes on many analog characteristics. With the preferred optical disk medium, the data is stored as alternating light polarization of a layer of material. The data is read back by the laser beam which beam is directed to an electro-optical sensor or converter thus providing an electrical signal which varies in response to the laser light. By changing the speed of the disk and scanning, the frequency and intensity characteristics of the laser light are altered, thereby altering the frequency and intensity characteristics of the corresponding electronic signal.

In virtually all recording and playback systems, there is required compensation circuitry to make up for nonlinear characteristics of the system. These compensation systems are critical to the proper recovery of the audio and video and are included in the modulator 320A and demodulator 320 circuitry. Unfortunately, the nature of these nonlinear characteristics is dependent on the scanning speed, thus causing a serious compensation problem which is overcome in the above system. Most commonly, frequency response of the system changes in fashion which is dependent upon the frequency of the data. Many systems operate to detect the changes in the data rather than the data itself. The sensors which are thus used most commonly respond to the electrical, magnetic, electromagnetic, or optical flux from the storage and scanning mechanism combination and have an output which is proportional both to the magnitude and rate of change of the flux. The demodulator 320 thus must compensate for the change which compensation in turn must be altered as the rate of change of flux is altered by the changing of the scanning speed.

Figure 33:
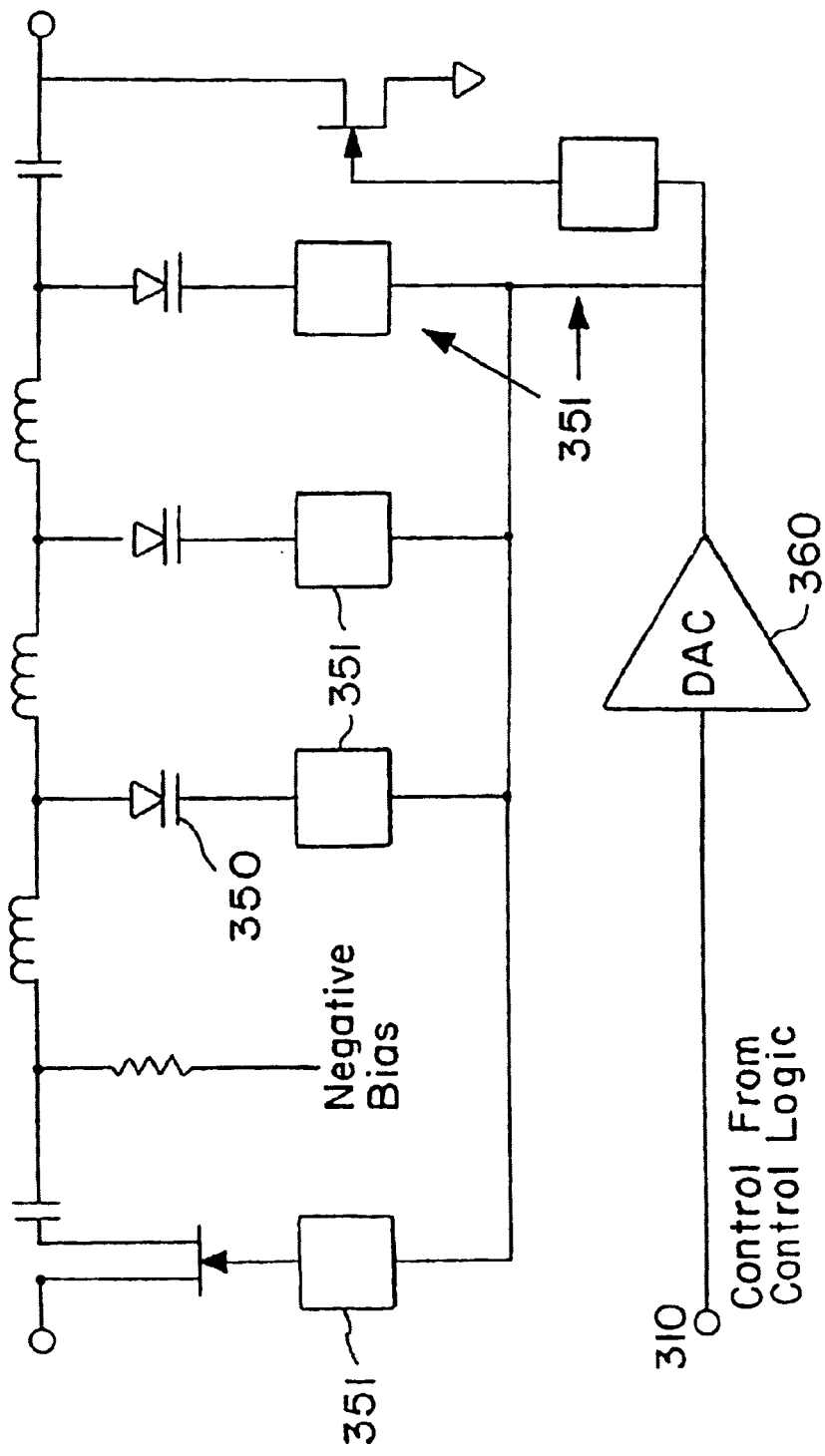

The requirement to change the compensation caused the demodulator 320 to be adaptive, and controlled by the user interface and control logic 310 in order to properly demodulate the audio and video at any of the continuously selectable playback speeds. FIG. 33 shows an adaptive filter network which is operable to change the filter compensation to fit the playback or record speed. The filter utilizes varactor diodes 350 to provide a voltage variable capacitance, thus changing the filter frequency characteristics. The voltage which is applied to the varactors is provided by a digital analog converter 360, which in turn is loaded with the appropriate digital number for the particular speed being used, which loading is accomplished by the user interface and control logic 310. Linearization or voltage mapping circuits 351 are provided at the input and output of the filter and at the varactors 350 to compensate for any non-linearities therein. In operation the filter operates to reduce the high frequency content of the data signal to a proper level, the amount of reduction depending on the speed of the data.

Returning to FIG. 31, as for any particular physical storage medium which would be preferred, the proper design of compensation at given fixed speeds is well known to those skilled in the art. It is believed that from the teachings given herein, those skilled in the art will also be capable of designing compensation which is variable over a suitable range of operation. In this manner the invention of the figure may be practiced such that the operator may select any speed within a range of speeds with the recording and playback of data of the storage medium operating properly.

It should be noted that some existing audio tape recording systems have the capability to change frequency equalization of the audio signal as the tape speed is changed from one discrete speed to another, for example from 7.5 IPS to 15 IPS. In addition, many of these tape recorders may playback at continuously variable speeds to facilitate searching. Applicant is unaware of any of these systems having continuously variable equalizers to insure properly equalized audio at all of the continuously selected speeds which the operator is capable of selecting.

After the audio and video is demodulated by the adaptive demodulator 320, it is required to pitch correct the audio under control of the user interface and control logic 310 as by the circuitry described in the preceding figures, and to convert the rate of the video to standard rates in order that it may be viewed on standard viewing devices. The video rate converters 330 are known in the art as frame synchronizers. While it is possible for frame synchronizers to operate self contained, improved operation and lower cost may be obtained by providing the rate converter with information and control from the user interface and control logic, and additional features such as video special effects may be provided as well. The pitch converter 340 is as set forth in this present application.

If it is desired to record at variable rates, the same problems as described above for playback enter into the proper modulation of audio and video before recording. Consequently it is needed to provide an adaptive modulator 320A. In addition, it may be desirable to provide a pitch corrector 340A and video rate converter 330A on the record side of the device in order that the recorded data appears as if it had been recorded at a particular rate. One skilled in the art will recognize that a desired end result of expanding or compressing a time segment may be achieved by operating on the video and/or audio either when recording or upon playback or both. In addition, there is no requirement that both audio and video be operated on at the same time, as one may be corrected on recording and the other upon playback.

A two way pitch shifter has been implemented with a Star Semiconductor SPROC IC and is shown in FIG. 20. The SPROC IC is available from Logic Devices, Inc. of Sunnyvale, Calif. and is of type SPROC-1400-50PG132C. Information on the use of this and similar ICS is available from Logic Devices, Inc.

The preferred embodiment would use type SPROC-1400-50MQ144C, which functions similarly, but at a lower cost.

The block diagram FIG. 26 is directly compatible with the SPROC Development System Part Number SPPROClab™ version 1.25, P/N SDS-1001-03 with SPROClab version 1.25 patch B, P/N SDS-1002-01B. FIG. 26 is a schematic representation of digital signal processing.

In this embodiment of the invention, the frequency converter system is specifically designed for a stereo audio source having a 20 kHz input bandwidth. However, it should be understood that the frequency converter system is equally adaptable to systems of various input frequencies and bandwidths. The audio input signals 10 are sampled at 48 kHz sample rate. The 50 MHz P/N SPROC-1400-50PG132C SPROC chip is used for processing. Left and right channels are processed identically, and in parallel. Some control blocks (or "cells" in the Logic Devices, Inc. nomenclature) are common to both left and right.

Three basic operations are performed: stretch (or expand)/interpolate or compress/interpolate, reset, and reset timing control.

ST-INO 202 accepts Format 2 stereo input samples which are provided by a Crystal Semiconductor CS5326 A–D Convertor. Output 1 is the right channel, and output 2 is the left. This discussion will concentrate on the left channel and common processing.

Stretch cells ST1 200 and ST2 201 each perform the stretch/interpolate or compress/interpolate functions in stereo. Most of the time, only one is actually connected to the output. Two are required during a reset operation, as will be described below. ST1 200 and ST2 201 perform reads and writes to RAM circular buffers 56, 57 in order to accomplish the stretch or compress function.

Two way stretch cells are used at ST1 200 and ST2 201. In the pitch increase mode, delay might start at 35 mS and decrease until a crossfade reset event occurs. At reset, delay is returned to or near 35 mS, and the process repeats. In the pitch decrease mode, delay starts at or near zero, and increases until a cross fade reset event occurs. At reset, delay returns to near zero, and the process repeats. Thus, while in the pitch decreasing mode some program material is discarded at a reset, in the pitch increasing mode some program material is repeated. In the pitch increase mode, ST1 200 and ST2 201 output stereo samples at the 35 mS memory candidate reset point for splice match testing. These samples, "OUTC" 203 and "OUTD" 204 of ST1 200 (203A, 204A) and ST2 201 (203B, 204B) cells, pass through switches SW3 205 and SW4 206 so that those of the correct stretch cell may be selected. If the pitch decrease mode is selected, "OUTC" and "OUTD" produce samples of near zero delay.

An abrupt reset of a single stretch cell often results in an audible click. In this design, a more gradual reset occurs as follows. Suppose only ST1 200 is connected to the output. Further suppose the pitch decrease mode is operative. At the start of a reset, ST2's 201 delay is set to or near zero. At the same time, a gradual fade from ST1 200 to ST2 201 is initiated and performed by 207. At the completion of the fade, only ST2 201 is connected to the output. The delay through each stretch cell continues to change during the fade operation. At the next reset, the operation is reversed, and so on. This technique is effective at suppressing reset clicks.

The left channel outputs of ST1 200 and ST2 201 connect to the output via MFADEO 207. A ramp signal is applied to MFADE 207 to accomplish the fade. This ramp is formed by MMV1 211, MMV2 212, MINUS3 217, and INT2 214. Depending on direction, either oneshot MMV1 211 or MMV2 212 produces a pulse 3072 samples (64 mS) long. Integrator INT2 214 forms the ramp. Subtraction cell 217 causes alternate ramps to be in different directions. INT2 214 output takes values between 0 and 1.0. Ramp length of 64 mS was determined empirically. Too short a ramp produces an abrupt transition; too long produces an echo effect.

A reset is initiated only when the differences between input and output slope and instantaneous amplitude are within certain limits, in order to make the cleanest splice practicable. Amplitude and slope match for the left channel are measured by MINUS2 221; first difference cell DIFF2 222; and cells p1 223 and p3 224. SW1 225 selects the appropriate stretch cell output. p1 223 or p3 224 produces an active low reset signal whenever the magnitude at the cell input is below a certain threshold. These thresholds are continuously scaled according to signal level and slope. The intent is to require the same relative match, independent of amplitude or instantaneous frequency. This scaling is performed by SUM1 213; DIFF3 230; and, peak detectors PD0 231 and PD1 232. SUM1 213 performs full wave rectification, of each input, and sums the results to produce its output. PD0 231 and PD1 232 gains set the degree of match required.

Outputs from p1 223 and p3 224, as well as outputs from the corresponding right channel cells p9 235 and p10 236, must all be simultaneously low to enable a reset. Or gate OR1 229 performs this function. Additionally, cell p7 237 sets the minimum time between reset events at 9600 sample periods (200 mS). Any reset inputs to p7 within the last 200 mS from a reset output from p7 are ignored. The 200 mS value was empirically optimized as a compromise between rapid warble like artifacts and loss or repetition of program material. Minimum time between resets could be caused to vary randomly about the 200 mS value, to reduce the periodicity of resets. Some artifacts are still detectable. Cells p8 247 and OR4 248 have been carried over from previous design iterations, but are not functional in this design.

P7 237 emits a one sample width active low reset pulse. This is steered to the appropriate oneshot and stretch cells by logic formed by threshold detector GT1 238; INV1 240; OR2 241; and, OR3 242. Delay cells DELAY2 245 and DELAY4 246 are intended to correct timing misalignments.

Cells that are specific to right channel operation are DELAY3 249, SW2 250, MINUS4 251, SUM4 252, p9 235, p10 236, DIFF4 252, DIFF5 253, PD2 254, PD3 255, RECT5, and p11 256. p11 is not functional in this design. Stereo output is accomplished by parallel port output cells OUT0 257 and OUT1 258. Output parallel data is subsequently converted to serial format by hardware interfaced to the SPROC™ parallel port. This serial data is then converted to BX oversampling format by a Nippon Precision Circuits Ltd. SM5813APT IC. The over sampled data is passed to two Analog Devices, Inc. AD1862N digital-to-analog converter ICS, to produce analog stereo audio output. Control of pitch correction factor and reset point is accomplished by changing the output levels of VR98 259 and VR99 260. To decrease pitch by 9.09 percent, VR98 level should be 2 (reset point of 2 samples delay), and VR99 level should be 1.0. For no pitch change, VR98 level should be 2, and VR99 level should be 0.0. To increase pitch 10 percent, VR98 level typically would be 1680 (reset point of 1680 samples, or 35 mS, delay), and VR99 level should be −1.1. AMP3 261 scales the pitch correction factor output from VR99 260 and passes it to stretch cells ST1 200 and ST2 201. The output levels of VR98 259 and VR99 260 may be modified by the SPROC development system, both during the initial building of the design, and during operation. Ideally, pitch correction factor and reset point may be controlled by an embedded microprocessor communicating with one of the SPROC ports. Serial output cell OUT3 262 sends the fade ramp signal to a PCM56 DAC on the development board. This signal is a useful telltale of system performance. This port is not supported in the production board hardware, but this signal could be sent to the probe port (which will be supported) by modifying the SPROC™ initialization code.

Left and right channels are reset simultaneously, and must meet the reset criteria simultaneously. The lowest gain possible for PD0 231, PD1 232, PD2 254, and PD3 255 should be used. Experiments with program material showed that gains of less than 0.1 (for example, 0.08) were too low. With gains of 0.08, excessive time between resets were regularly observed. Program material tests at 9.09 percent pitch decrease mode, with gains of 0.1, indicate that most resets occur within 250 mS, and that intervals beyond 300 mS are rare (the corresponding memory in the stretch cell would be one tenth these numbers; at 9.09 percent pitch decrease). These gains, as well as the other parameters such as minimum reset interval and ramp slope are easily changed in software.

The memories of ST1 200 and ST2 201 in FIG. 20 are arranged as circular buffers. Data is continuously written to the inputs such that each buffer contains the most recent samples for a period equal to the memory length. In fact, the contents of each memory are the same, since each has the same input. In addition, OUTC 203A and OUTC 203B output the same data. The same is true for OUTD 204A and OUTD 204B. Therefore, an improved embodiment would be obtained by combining ST1 200 and ST2 201, and using a single memory. SW3 205 and SW4 206 would no longer be required. It may also be possible to combine the functions of OUTA with OUTC and OUTS with OUTD, respectively. A minimum of two separate memory outputs would still be needed, of course, to support the signal comparison and reset operations. Further code savings could be obtained by eliminating the NDXIN and NDXOUT outputs from ST1 200 and ST2 201, or a combined cell, since these outputs are not used in this embodiment.

FIG. 27 shows pitch correction integrated with the delay function. The pitch corrector functions of FIG. 25 are essentially cascaded intact with the delay function, except with the added ability to force or inhibit stretch cell 200 and 201 reset. Cell TAU0 263 operates directly on the input samples, and produces delay. TAU0 263 changes delay in a manner identical to stretch cell operation, but without resetting. TAU0 263 utilizes external memory. Since pitch shift occurs during delay change, TAU0 263 output is passed to ST1 200 and ST2 201 for pitch correction. TAU0 263 also performs parallel port access for stereo sample output and microcontroller interface. Stereo output samples from MFADE0 207 are passed to TAU0 263 for output via the SPROC™ parallel port.

Cell CN0 264 coordinates operation of the delay and pitch correction cells. TAU0 263 reports its current delay to CN0 264. CN0 264 reads stretch cell index values. The indices from the active stretch cell are selected by SW5 265 and SW6 266. CN0 264 computes the current stretch cell delay, and adds the TAU0 263 delay to determine total delay. This total delay is passed to TAU0 263 for parallel port output to the micro-controller.

Target delay is read from the microcontroller via TAU0 263. If total delay equals target delay, CN0 264 holds TAU0 263, ST1 200, and ST2 201, by writing zero to the slew factor inputs of those three cells, and inhibiting stretch cell reset.

If total delay differs from target delay by more than 20 mS, the following sequence of events occurs. First, the stretch cells are initialized. If the delay change direction should be opposite of the previous change, it is likely that the initial stretch cell delay is too far removed from the appropriate reset point. CN0 264 sweeps the reset point values in the vicinity of the nominal for a period of 0.5 Sec, enabling a high probability of a splice. When this splice occurs, the stretch cell becomes initialized without an abrupt transition. Then, CN0 264 outputs complementary slew values to TAU0 263, ST1 200, and ST2 201. This produces delay change and pitch correction at a ten percent rate. ST1 200 and ST2 201 delay the slew factor by the same amount as the audio, to maintain temporal registration between the two. The total delay change occurs primarily during fades, because of the pitch corrector reset action. Delay change during each fade is generally of slightly more than 20 mS in size. When the total delay becomes within +/−20 mS of the target, the stretch cells are held, and TAU0 263 slews at a 0.2 percent rate, without pitch correction, until the target is reached. If TAU0's 263 delay reaches zero before the target is reached, TAU0 263 is held, and the stretch cell delay is decreased at a 0.2 percent rate, without pitch correction, until the total delay is correct.

For delay changes of 20 mS or less, the delay slews at a 0.2 percent rate, without stretch cell initialization or pitch correction.

The minimum delay target is one sample (1/48000 Sec.), not counting data converter decimation or interpolation filter delay. Dump mode is enabled by requesting zero delay. In dump mode, TAU0 263, ST1 200, and ST2 201 are reset to minimum delay and held. Requesting a nonzero delay target causes normal operation to resume. In the present embodiment, control via the SPROC™ development system is substituted for microprocessor control.

In FIG. 27 ST1 200 and ST2 201 could also be combined in a manner similar to that described for ST1 200 and ST2 201 of FIG. 26. As before, SW3 205 and SW4 206 would not be needed. In a combined stretch cell, only a single output NDXIN would be required, which would also eliminate. SW5 265.

Further reduction in code would be obtained by combining ST1 200 and ST2 201 not only with each other but also with memory cell TAU0 263. A single memory would then be used. In both FIG. 26 and FIG. 27, a smoother fade ramp could be obtained by using a raised cosine function, instead of a linear ramp. In an improved embodiment, a watchdog timer function would be incorporated into the hardware and code.

The preferred embodiment of the present invention may be modified without deviating from the invention as claimed.

For example, the preferred embodiment is described as operating on the input signal, a signal which is being produced at a first speed, to produce the output signal, which output is subsequently clocked at the second speed to provide the same frequency based information. It would be possible to modify the order of conversion without deviating from the invention as claimed. For example, one could modify the frequency conversion system of the present invention to create a second plurality of signals clocked at different speed prior to frequency conversion. This could occur, for example, on a taped system operated at a higher or lower speed than normal to produce a signal in need of frequency conversion. It could also occur on any type of signal wherein the signal is stored on a disk, record, tape, computer RAM memory, or otherwise in either a digital or analog form, which signal is capable of being operated at something other than real time speeds (both faster or slower). In this modified device, the input signal would be reproduced at the output signals speed in order to create a version of the second plurality of signals. An example of this would be to speed up an audio tape recorder to produce a pitch changed version of the audio stored thereon. At this time, the frequency converter system of the present application would act upon this sped up version of the second plurality of signals in order to modify the number of samples therein to meet the requirements of the new clock speed and thus produce the pitch shifted output signal. No further memory would be needed if the sampling rate was high enough. In the example audio tape recorder, samples would be added in order to lower the pitch of the output signal to match the pitch of the input signal originally recorded on the tape recording, and thus produce a output signal having a frequency substantially the same frequency as the input signal. The frequency converter of this invention can therefore operate before, during or after the clock shift of the input signal. Similarly, the clock shift can be upwards (compression), downward (expansion), or the same as (dropout compensation, profanity dump) at any time during recording, storage, and/or replication of the input signal.

It is envisioned that other known techniques described in technical literature as referenced below, such as homomorphic signal processing, subband coding, Fourier transformation[5], power spectrum estimation[1] correlation, or measurement of relative second or higher order differences, could be used or adapted to improve the signal comparison. For example, homomorphic deconvolution, followed by linear filtering, may be applied to speech signals to separate pitch and other components[1,2]. Separated parameters could be respectively compared. As another example, in subband coding a speech, image, or other waveform is divided into several frequency bands, where each band is coded separately. Individual subband components could be respectively compared. As a further example, spectrum amplitude and/or phase components as resolved by Fourier transformation could be compared. In the case of correlation, signals could be compared over some length considerably larger than that of the comparison used in the present embodiment.

It is envisioned that in an improved embodiment techniques such as homomorphic deconvolution, subband encoding, or Fourier transformation[5] could be used, with suitable modification, prior to the pitch shifting operation, to provide signal component separation. The pitch conversion would then be applied to one or more of the separated signal components. As a particular example, homomorphic deconvolution, followed by linear filtering, followed by the inverse to the homomorphic deconvolution, may be applied to a speech signal to separate pitch from other components. The described invention could be applied to the so obtained pitch signal. Next, the frequency converted pitch signal would be suitably recombined with the other components. It is known that the representation of speech in parametric form allows a modified pitch contour to be applied to the data[2].

It is also envisioned that data compression techniques would be advantageous. For example, linear predictive coding applied to a speech or other signals reduces the data rate required to represent the waveform[3]. Likewise, subband coding applied to speech, video, or other signals reduces the data rate required to represent the waveform[3]. Narrow band voice modulation (NBVM)[4] techniques reduce the occupied bandwidth of a speech signal, allowing a lower sample rate to be used. Operating on compressed data would reduce the described invention's memory and signal processing hardware requirements.

1. Oppenheim, Alan V., and Shafer, Ronald W., Digital Signal Processing, Prentice-Hall, 1975.
2. Rabiner, Lawrence R., and Gold, Bernard, Theory and Application of Digital Signal Processing, Prentice-Hall, 1975.
3. Proakis, John G., Rader, Charles M., Ling, Fuyun, and Nikias, Chrysostomos L., Advanced Digital Signal Processing, Macmillen, 1992.
4. Ash, Christensen, and Frohne, "DSP Voice Frequency Compander for use in RP Communications," QEX, July 1994.
5. Benson, K. Blair, Audio Engineering Handbook, McGraw-Hill, Inc., 1988.

Figure 6:
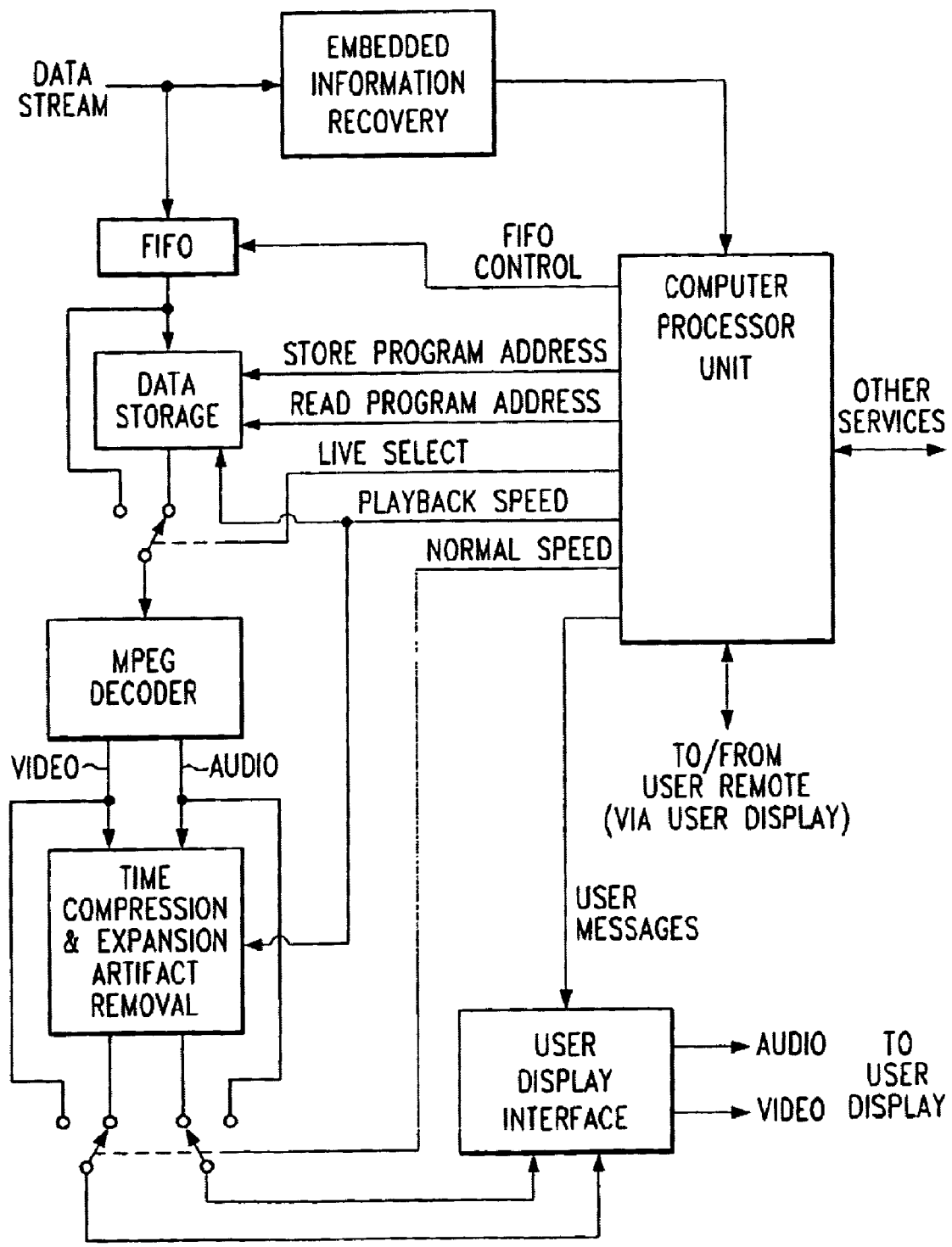
FIG. 6 shows a diagram of the Data Manager and Data Storage portions of the invention.

FIG. 6 show Data Manager and Program Data Processor implemented by a Computer Processor Unit, and Data Storage for a single program data stream. The data stream, which may have embedded information is coupled to a Embedded Information Recovery Circuit and to a FIFO. The FIFO is provided to temporarily store incoming data while the Embedded information (if any) is recovered and acted on by the Computer Processor Unit. Embedded information may contain program related information such as program type, air date and time, source or other information for the present or future programs which the user would find useful in determining the desirability of using or storing the program. For example, if the user desires to store sports highlights programs and the type of program (sports highlights) is carried as embedded information, the Computer Processor Unit will receive this information and direct the data storage to store the data carrying the program. When data is to be stored, the Computer Processor Unit selects a program address which the Data Storage uses to store the program. The Computer Processor Unit may either tell the Data Storage what address to use, or may receive the address used therefrom. It is preferred that the Computer Processor Unit keep track of all address information and select an appropriate address, giving that address to the Data Storage. The Computer Processor Unit also stores the information relating to the program, such as date, time, program name, program type, length of program, etc. along with the location of the program in the Data Storage, in order that the user may be informed of this stored information upon request, and in order for the Computer Processor Unit to properly manage storage, reading and overwriting of the data which is stored. The Computer Processor Unit also selects either incoming data or stored data to be coupled to the MPEG decoder which decompresses the data stream into digital video and audio data streams. The video and audio data streams are then coupled to the User Display Interface circuit, which coupling may be direct or via the Time Compression and Expansion Artifact Removal circuit, under control of the Computer Processor Unit. The User Display Interface converts the digital audio and video data stream to proper form for use by the User Display (if necessary) and in addition combines user messages of audio and video type from the Computer Processor Unit with the data streams which are coupled to the User Display. The Computer Processor Unit controls the selection of programs to be read out of Data Storage by providing proper Read Program Address, and also controls the playback or read speed of the program in response to the users wishes. In the event of playback other than normal, the uncompressed audio and video are coupled through the Time Compression And Expansion Artifact Removal circuit. This circuit operates to remove pitch artifacts in the audio and motion artifacts in the video by use of the invention described in copending U.S. patent application Ser. No. 089,904. While the above storage system has been described with respect to the preferred normal rate storage and variable rate reading, it is of course possible to reverse the situation with variable rate storage and normal rate reading in order to perform time compression and expansion in those systems where there is control of the incoming data rate. In addition, while it is preferred to store MPEG compressed data for reasons of memory economy, it is also possible to store uncompressed program data. The Computer Processor Unit also serves to manage the interaction with the User via communications with the User Remote and messages provided on the User Display. The Computer Processor Unit provides control of the Data Storage to accommodate the Users wishes as well as providing and maintaining management of all of the data related to the stored programs and any programming guide information which is received via other services or the Program Data Stream.

Although this invention has been described in its preferred form with a certain degree of particularity, it is understood that the present disclosure of the preferred form has been made only by way of example and that numerous changes in the details of construction and the combination and arrangement of parts may be resorted to to provide equivalent functions and elements of the invention without departing from the spirit and scope of the invention as hereinafter claimed. For example, the FIFO in FIG. 6 is used to allow processing of the program information by the CPU before accessing the data stream. This is necessary due to the contemporaneous transmission of the program information and corresponding data. With systems having advanced program information, this FIFO would not be necessary. Other changes are also possible.

What is claimed is:

1. I claim an improved access system for multiple television programs delivered in compressed form on one or more delivery channels,
  said access system including at least one of the multiple programs being delivered without a user's specific request,
  at least one of said multiple programs including at least some substantive displayable information that may be distinct from a listing of the programs allowing access, storage, and/or retrieval thereof,
  the accessible program having frequency related information with a certain run time of presentation for a user who may desire a run time that can be different,
  said access system further including:
  means for recording at least two of the multiple programs in a data random access capable storage medium at the user's location, means for the user to select a particular program from the data storage medium at the user's location and means to decompress said particular television program for use by the user before or after storage, which use can include display of a particular program including at least some of said substantive displayable information, and
  means to alter the frequency of the frequency related information to compensate for a different run time of presentation.

2. I claim the access system of claim 1 characterized in that there is one storage medium for storing multiple programs delivered on a schedule over which the user has no control.

3. I claim the access system of claim 1 characterized in that the programs are stored in a compressed format.

4. I claim the access system of claim 1 characterized by the addition of program information delivered to and stored at the user's location and means to access said program information,
  the addition of means to store at least two of the multiple programs in compressed form in a random access capable storage at the particular user's location and means at the particular user's location to selectively access and decompress the programs at that location respectively,
  said access including displaying the programs, which displaying can include the program including said at least some substantive displayable information.

5. I claim the access system of claim 4 characterized by the addition of data manager means to allow a user to access the program.

6. I claim a system having multiple television programs delivered in a compressed form on one or more delivery media together with program identification data to a user at a given user location,
  at least one of said multiple programs including at least some substantive displayable information that may be distinct from a listing of the program identification data,
  the system including:
  means at the given user location to record program identification data for the multiple programs and at least one of the multiple programs being selectively recorded in response to the user's input,
  the recorded program having frequency related information with a certain run time of presentation for a user who may desire a run time that can be different,
  means at the same given user location to access the recorded program identification data for the multiple programs, means at the same given user location to process the recorded program identification data to allow selective access to at least two of the multiple programs,
  means for the user to record in a random access capable storage and use said at least two of the multiple programs at the user location, which use of such programs can include display of the program including said at least some substantive displayable information, and
  means to alter the frequency of the frequency related information to compensate for a different run time of presentation.

7. I claim the system of claim 6 characterized in that the multiple programs and program identification data are delivered contemporaneously and by the addition of means to delay the programs to allow processing of the program identification data.

8. I claim the system of claim 6 characterized by the addition of data manager means to process the program identification data.

9. I claim the access system of claim 6 characterized by the addition of data manager means to allow the user to access the programs.

10. I claim an improved system for delivering multiple television programs in a compressed form via one or more delivery channels from a site to a particular user's location without the particular user's control,
  at least one of said multiple programs including at least some substantive displayable information that may be distinct from a listing of the programs allowing access, storage, and/or retrieval thereof, said improvement including:

the addition of means to store at least two of the multiple programs in compressed form in a random access capable storage at the particular user's location and at least one of the multiple programs being selectively recorded in response to the user's input, the recorded program having frequency related information with a certain run time of presentation for a user who may desire a run time that can be different, means at the particular user's location to selectively access and decompress the programs at that location respectively, said access including displaying the programs, which displaying can include the program including said at least some substantive displayable information, and means to alter the frequency of the frequency related information to compensate for a different run time of presentation.

11. I claim the access system of claim 10 characterized in that said means to store the programs includes an optical storage medium.

12. I claim the access system of claim 10 characterized in that said means to store the programs includes computer memory.

13. I claim the access system of claim 10 characterized in that the programs are compressed in MPEG and means to selectively decompress said MPEG signals.

14. I claim a multiple program access system having a program television material storage capability in a random access capable storage with a limited capacity, the improvement including:

means to store at least two of the multiple programs in the storage having a limited capacity at a user location, overwrite means to automatically overwrite previously stored program material including at least some program material which has not been previously accessed based on determinable criteria developed from a known set of priorities, said known set of priorities which includes at least one priority other than updating of existing program materials, means to pass the programs through a circuit producing a frequency artifact, and means to selectively bypass the frequency artifact producing circuit.

15. I claim the system of claim 14 characterized in that said overwrite means includes consideration of available storage.

16. I claim the system of claim 14 characterized in that said overwrite means includes consideration of the time the program material was stored.

17. I claim the system of claim 14 wherein there are multiple users having a priority and characterized in that said overwrite means includes consideration of the multiple user's priority.

18. I claim a multiple program access system having a program television material storage capability for programs, the multiple programs subject to an access, storage, and/or retrieval date, the improvement including:

a decompression circuit and a circuit producing a frequency artifact, means to store at least two of the multiple programs in the program material storage area at a user location, the storage area having a random access capability, means to automatically allow access for storage of programs in previously utilized program material storage area upon occurrence of a certain event other than the accessing one of the stored multiple programs in such program material storage area, with at least one of said multiple programs including at least some of said substantive displayable information, a frequency artifact modifier circuit, means to pass the programs through the decompression circuit and through said frequency artifact modifier circuit, and means to selectively bypass the frequency artifact modifier circuit.

19. I claim the access system of claim 18 characterized in that said certain event is the arrival of a certain time subsequent to the time of a particular program's storage.

20. I claim a multiple television program access system having an ability to reproduce an accessible program having frequency related information with a certain intended run time of presentation for a user requiring a different run time of presentation, the improvement including:

means to store at least two multiple programs at the user location in program data storage, said storage having a random access capability, means to select the accessible program from program data including the at least two multiple programs and means to alter the frequency of the frequency related information to automatically compensate for the different run time of presentation and thus the certain run time of presentation of the accessible program to the different run time.

21. I claim the access system of claim 20 wherein the different run time is determined by the user's interruption of access to the programs.

22. I claim the access system of claim 21 characterized in that said accessible program would normally terminate at a time certain and characterized in that said automatic means alters the different run time so as to terminate said accessible program at the same time as said time certain.

23. I claim an access system for multiple television programs delivered in compressed form across one or more delivery channels, the multiple programs include at least one program delivered without a given user's request therefor and a listing which may be separate of the programs allowing access, storage, and/or retrieval thereof, a program data stream, said program data stream including at least some substantive displayable information, said access system including:

means at the given user's location to select a particular program from said program data stream without off location contact using the listing, the accessible program having frequency related information with a certain intended run time of playback for a user desiring a different run time, means to record said selected program with another program in a random access capable multiple program data storage media at the given user's location, means to selectively decompress said selected program for display, said display which can include display of the program including said at least some substantive displayable information, and means to alter the frequency of the frequency related information to compensate for the different run time of presentation.

24. I claim the system of claim 23 characterized in that program identification data is also delivered for those programs delivered without a given user's request, the multiple programs and program identification data being delivered substantially contemporaneously and by the addition of means to delay the programs to allow processing of the program identification data.

25. I claim the system of claim 24 characterized by the addition of data manager means to process the program identification data.

26. I claim an access system having a storage area for multiple television programs having substantive displayable information, the programs subject to access, storage, and/or retrieval by a listing, the improvement including:

means at a user location to record at least part of at least two multiple programs having substantive displayable information in a program material random access capable storage area, means at the user location to access at least part of a given program having substantive displayable information from the program material storage area so as to select reproduction thereof, the accessible program having frequency related information with a certain predetermined run time of presentation for a user utilizing a different run time of presentation, means at the user location to record programs having substantive displayable information at the same time as said reproduction which recording can include the remainder of said given program and/or another program in the storage area, and means to alter the frequency of the frequency related information to compensate for the different run time of presentation.

27. I claim an access system having a decompression circuit and a frequency artifact producing circuit, the improvement of means to record in program data storage and display at least two multiple television programs at a user location, a frequency artifact modifier circuit, means to pass the programs through the decompression circuit and then through said frequency artifact modifier circuit, and means to selectively bypass the frequency artifact modifier circuit when the frequency artifact producing circuit is inactive.

28. I claim the access system of claim 27 characterized in that the decompression decoder is a MPEG decoder.

29. I claim the access system of claim 27 characterized in that the artifact modifier circuit is a frequency converter.

30. I claim an access system having multiple channels of substantive displayable information and access information for delivery of multiple television programs to a remote location, at least one of the multiple television programs having frequency related information with a certain intended first length of time of presentation for uses by a user desiring a different length and second run time of presentation, the improvement including:

a data manager, said data manager being located at said remote location, said data manager having a memory for storing the access information relative to the delivered information including information relative to at least one delivered upcoming program, means for said data manager to selectively control access to the substantive displayable information on the multiple channels for presentation of said programs which can include the display of said at least one delivered upcoming program and the recording of at least two of the multiple programs in a random access capable program material storage at said remote location, and means to alter the frequency of the frequency related information to compensate for the different and second length of presentation.

31. I claim the access system of claim 30 characterized by the addition of a data storage for the channels of information.

32. I claim the access system of claim 30 characterized by the addition of program information relative to the multiple channels of information and means for said data manager to utilize such program information.

33. I claim the access system of claim 30 characterized by the addition of other services and means for said data manager to access said other services.

34. I claim an improved access system for a particular user to access multiple television programs delivered in compressed form via one or more delivery channels, at least one of said multiple programs including at least some substantive displayable information, said access system including program information delivered separate from said substantive displayable information to the particular user at the given location, means for recording at least two of the multiple programs in a compressed format in a random access capable program data storage medium at the given location with at least one of the multiple programs being selectively recorded in response to the user's input, said selectively recorded program having frequency related information with a certain run time of presentation for a user who may desire a run time that can be different, means at the given location for the particular user to access said program information and to select a particular program for presentation at the given location, means to decompress said particular program for display which can include the display of said at least some substantive displayable information, and means to alter the frequency of the frequency related information on said particular program to compensate for a different run time of presentation.

35. I claim the access system of claim 34 characterized by the addition of data manager means to allow the user to access the program.

36. I claim a system having multiple television programs transmitted in a compressed form via a transmission media with program identification data transmitted to a particular user at a given location, at least one of the programs including at least some substantive displayable information that may be other than the program identification data, the system including means at the given location for the particular user to directly access the program identification data, the accessible program having frequency related information with a certain intended run time for a first length of presentation for a user desiring a different run time for a second length of presentation, means to delay the programs to allow processing of the program identification data, means to process the program identification data at the given location, data manager means at the given location to process the program identification data and to allow the particular user to selectively access the programs at the given location, which access can include the display of said at least some substantive displayable information and the recording of at least two of the multiple programs in a program material storage area at the given location, and means to alter the frequency of the frequency related information to compensate for the different length of run time of presentation.

37. I claim an improved system for a multiplicity of television programs transmitted in a compressed form on one or more transmission channels, a listing of the programs to allow the access, storage, and/or retrieval thereof also being transmitted, characterized by the addition including:

means to store at least two of said multiplicity of programs in their compressed form at a given location, at least one of said multiplicity of programs including at least some substantive displayable information, said means to store the programs including a random access capable optical storage medium which storage can include said at least some substantive displayable information, means to selectively access a program using the listing and decompress the program from said means to store at least two of said multiplicity of programs in program data storage at said given location for display, the accessible program having frequency related information with a certain intended run time of presentation at a first speed for a user who may desire a different run time of presentation at a second speed, and means to alter the frequency of the frequency related information to compensate for the different run time of presentation.

38. I claim the access system of claim 37 characterized in that the programs are compressed in MPEG and means to selectively decompress said MPEG signals.

39. I claim the access system of claim 37 characterized in that there are a number of sets of multiplicity programs that can be selectively stored.

40. I claim an improved access system for multiple substantive displayable television programs delivered via one or more delivery channels to a user location, a listing of the programs allowing the access, storage, and/or retrieval thereof also delivered, said access system including:

a random access capable program data storage at the user location, said program data storage recording at least two selected ones of the multiple delivered programs, a user control, said user control selectively retrieving said selected ones of the multiple delivered programs from said program data storage using the listing, the accessible program having frequency related information with a certain intended length of time of presentation for a user desiring a different length of time of presentation, means to alter the frequency of the frequency related information to compensate for the different length of time of presentation, and said program data storage simultaneously recording other selected portions of the multiple delivered programs as said selected portion of a substantive displayable program is being selectively retrieved by said user control.

41. I claim the access system of claim 40 characterized in that said selected portion and at least one of said other selected portions are from the same program.

42. I claim the access system of claim 40 characterized in that said selected portion and at least on of said other selected portions are from different programs.

43. I claim an improved access system for multiple substantive displayable television programs delivered via one or more delivery channels to a user location, a listing of the programs allowing the access, storage, and/or retrieval thereof also delivered, said access system including:

a random access capable program data storage at the user location, said program data storage recording at least two selected ones of the multiple delivered programs, said selected portion and at least one of said other selected portions are from the same program, a user control, said user control selectively retrieving said selected ones of the multiple delivered programs from said program data storage using the listing, said program data storage simultaneously recording other selected portions of the multiple delivered programs as said selected portion of a substantive displayable program is being selectively retrieved by said user control, said program having a normal presentation conclusion time from initial retrieval and characterized in that the retrieval of said selected portion can be selectively interrupted by the user for a period, any retrieval of said selected portion can be accelerated to compensate for said period, and said acceleration allowing the program to end at the normal presentation conclusion time.

44. I claim the access system of claim 43 wherein the program has a frequency and characterized by a frequency shift means, and said frequency shift means altering the frequency of any accelerated portion to be substantially equal to the frequency of the program.

45. I claim an improved access system for multiple television programs transmitted via one or more transmission channels, and a listing of the programs allowing the access, storage, and/or retrieval thereof, said access system including:

a data manager, said data manager being located at a particular user's given location, a data stream, said data stream passing via a delivery channel for recording in said data manager, a user control, said user control allowing access to the data in said data manager using the listing of programs, the accessible program having frequency related information with a certain first run time of presentation for a user who may desire a second and different run time of presentation, a random access capable program data storage at the particular user's given location, said program data storage recording at least two of the multiple programs transmitted on the transmission channel without any active selection by the user, at least one of said programs including at least some substantive displayable information, means for the user at said given location to use data in said data manager to retrieve selected portions of the programs in said multiple program data storage via the listing thereof, which retrieval can include the display of said at least some substantive displayable information, and means to alter the run time of presentation of the accessible program to the different run time.

46. I claim the access system of claim 45 characterized in that said data stream includes information of upcoming substantive programs.

47. I claim the access system of claim 45 characterized in that said user control can be selectively programmed to automatically record programs in said program data storage based on the data in said data manager.

48. I claim the access system of claim 45 characterized in that substantially all of the programs transmitted on a transmission channel at transmitted without any user's control.

49. I claim the access system of claim 48 characterized in that the programs are substantially continually transmitted.

50. I claim the access system of claim 45 characterized in that said program data storage can record programs and the user can retrieve a program from said program data storage at the same time.

51. I claim an improved access system for multiple television programs transmitted via one or more transmission channels, and a listing of the programs allowing the access, storage, and/or retrieval thereof, said access system including:

a data manager, said data manager being located at a particular user's given location, a data stream, said data stream passing via a delivery channel for recording in said data manager, a user control, said user control allowing access to the data in said data manager using the listing of programs, a random access capable program data storage at the particular user's given location, said program data storage recording at least two of the multiple programs transmitted on the transmission channel without any active selection by the user, at least one of said programs including at least some substantive displayable information, means for the user at said given location to use data in said data manager to retrieve selected portions of the programs in said multiple program data storage via the listing thereof, which retrieval can include the display of said at least some substantive displayable information, the program of which said selected portion is a part, having a normal presentation conclusion time from initial retrieval and characterized in that the retrieval of said selected portion can be selectively suspended by the user for a period of time, any retrieval of said selected portion can be automatically accelerated to compensate for said period of time, and said acceleration allowing the program to end at the normal presentation conclusion time.

52. I claim the access system of claim 51 wherein the program has an original frequency and characterized by frequency shift means, said frequency shift means altering the frequency of any accelerated portion to be substantially equal to the original frequency of the program.

53. I claim an improved access system for multiple television programs transmitted on one or more transmission channels, said access system including:

a data manager, said data manager being located at a particular user's given location, a data stream, said data stream passing via a delivery channel for access at the direction of said data manager, a user control, said user control allowing access to the data in said data manager, the accessible program having frequency related information with a certain intended playback time of presentation for a user requiring a different playback time of presentation, a random access capable program data storage at the particular user's given location, said program data storage recording at least two of the multiple programs transmitted on the transmission channel without any active selection of individual ones of the specific programs by the user, at least one of said programs including at least some substantive displayable information other than listing data, select means at said given location for said data manager to use the listing data in said data manager to automatically record selected portions of the transmitted multiple programs in said program data storage, which recording can include said at least some substantive displayable information, and means to alter the time of presentation of the accessible program to a different playback time.

54. I claim the access system of claim 53 characterized in that said select means is programmed to discard programs recorded in said program data storage including programs not yet retrieved according to a known set of priorities.

55. I claim the access system of claim 54 characterized in that said known set of priorities includes the available recording room in said program data storage.

56. I claim the access system of claim 54 characterized in that said known set of priorities are ranked in an order of preference.

57. I claim the access system of claim 53 characterized in that said known set of priorities may be changed from time to time.

58. I claim the access system of claim 52 characterized in that a select means is programmed to record transmitted programs in said program data storage according to a selection algorithm.

59. I claim the access system of claim 57 characterized in that a selection algorithm includes one or more of consideration of the desirability of the program to the user, the number of users for a program, the time of the program, the relation of the program to programs previously stored, the content of the program, the particular channel for the program and/or the availability of removable storage.

60. I claim the access system of claim 58 characterized in that said select means is programmed to discard or record over previously recorded programs in said program data storage including not retrieved programs according to a known set of priorities.

61. I claim the access system of claim 60 characterized in that said known set of priorities includes the available recording room in said program data storage.

62. I claim the access system of claim 60 characterized in that said known set of priorities are ranked in an order of preference.

63. I claim the access system of claim 60 characterized in that said known set of priorities may be changed from time to time.

64. I claim a method for accessing multiple television programs delivered in compressed form on one or more delivery channels, said method including delivering at least one of the multiple programs without a user's specific request, at least one of said multiple programs including at least some substantive displayable information that may be distinct from a listing of the programs allowing access, storage, and/or retrieval thereof, said method further including:

recording at least two of the multiple programs in a random access capable data storage medium at the user's location, selecting a particular program from the multiple programs in the data storage medium at the user's location and decompressing said particular program for use by the user before or after storage, which use can include displaying of a particular program including at least some of said substantive displayable information, the accessible program having frequency related information with a certain intended playback time of presentation for a user requiring a different and faster playback time of presentation, and means to alter the frequency of the frequency related information to compensate for the different and faster playback time of presentation.

65. I claim the method of claim 64 characterized by storing multiple programs delivered on a schedule over which the user has no control in one storage medium.

66. I claim the method of claim 64 characterized by storing the programs in a compressed format.

67. I claim the method of claim 64 characterized by the addition of delivering and storing program information at the user's location and accessing said program information.

68. I claim the method of claim 67 characterized by the addition of using a data manager means to access the program.

69. I claim a method for accessing multiple television programs delivered in a compressed form on one or more delivery media together with program identification data to a user at a given user location, at least one of said multiple programs including at least some substantive displayable information that may be distinct from a listing of the program identification data, the method including:

recording at the given user location program identification data for the multiple programs, accessing at the same given user location the recorded program identification data for the multiple programs, processing at the same given user location the recorded program identification data to selectively access to at least two of the multiple programs, the accessible program having frequency related information with a certain intended speed of presentation for a user requiring a different speed of presentation, using said at least two of the multiple programs, which use of such programs can include display of the program including said at least some substantive displayable information and recording of at least two of the multiple programs in a random access capable program data storage at the given user location, and means to alter the certain speed of presentation of the accessible program to the different speed.

70. I claim the method of claim 69 characterized in that the multiple programs and program identification data are delivered contemporaneously and by the addition of delaying the programs to allow processing of the program identification data.

71. I claim the method of claim 69 characterized by the addition of processing the program identification data by a data manager means.

72. I claim the method of claim 69 characterized by the addition of accessing the programs by a data manager means.

73. I claim an improved method for delivering multiple television programs in a compressed form via one or more delivery channels from a site to a particular user's location without the particular user's control, at least one of said multiple programs including at least some substantive displayable information that may be distinct from a listing of the programs allowing access, storage, and/or retrieval thereof, said improved method including:

the storing at least two of the multiple programs in compressed form in a random access capable program data storage at the particular user's location and selectively accessing and decompressing a program at that particular user's location respectively, said accessing including displaying the programs, which displaying can include the program including said at least some substantive displayable information, the accessible program having frequency related information with a certain intended run time of presentation for a user requiring a different run time of presentation, and means to alter the frequency of the frequency related information to compensate for the different run time of presentation.

74. I claim the method of claim 73 characterized in that said storing the programs includes an optical storage medium.

75. I claim the method of claim 73 characterized in that said storing the programs includes computer memory.

76. I claim the method of claim 73 characterized by compressing the programs in MPEG and selectively decompressing said MPEG signals.

77. I claim a multiple program access method having a storage capability with a limited capacity, the improvement including:

the storage being random access capable storing at least two of the multiple programs in the program material storage having a limited capacity, at least one of the multiple programs being accessible, the accessible program having frequency related information with a certain run time of presentation for a user who may desire a run time that can be different, automatically overwriting previously stored program material including at least some program material which has not been previously accessed based on determinable criteria developed from a known set of priorities, said known set of priorities which includes at least one priority other than updating of existing program materials, and means to alter the frequency of the frequency related information to compensate for a different run time of presentation.

78. I claim the method of claim 77 characterized in that said overwriting includes consideration of available storage.

79. I claim the method of claim 77 characterized in that said overwriting includes consideration of the time the program material was stored.

80. I claim the method of claim 77 wherein there are multiple users having a priority and characterized in that said overwriting includes consideration of the multiple user's priority.

81. I claim a multiple television program access method having a storage capability for programs, the multiple programs subject to an access, storage, and/or retrieval date, the improvement including:
  storing at least two of the multiple programs in the random access capable storage area at a given user location, and automatically allowing access for storage of programs in previously utilized storage area upon occurrence of a certain event other than the accessing one of the stored multiple programs in such storage area, with at least one of said multiple programs including at least some of a substantive displayable information,
  passing the programs through a decompression circuit and through a circuit modifying a frequency artifact, and means to selectively bypass the circuit modifying a frequency artifact.

82. I claim the access method of claim 81 characterized in that said certain event is the arrival of a certain time subsequent to the time of a particular program's storage.

83. I claim a multiple program access method having an ability to reproduce an accessible television program having frequency related information with a certain intended run time of presentation from storage of at least two of the multiple programs, for a user requiring a different run time of presentation,
  the improvement including:
  selecting the accessible program from the at least two multiple programs in storage at the user location and altering the frequency of the frequency related information of such program to automatically compensate for the different run time of presentation and thus the certain run time of presentation of the accessible program to the different run time.

84. I claim the access method of claim 83 wherein the different run time is determined by the user's interruption of access to the programs.

85. I claim the access method of claim 84 characterized in that said accessible program would normally terminate at a time certain and
  characterized in that said altering the different run time so as to terminate said accessible program at the same time as said time certain.

86. I claim an access method for multiple television programs delivered in compressed form across one or more delivery channels,
  the multiple programs include at least one program delivered without a given user's request therefor and a listing which may be separate of the programs allowing access, storage, and/or retrieval thereof,
  a program data stream, said program data stream including at least some substantive displayable information,
  said access method including:
  selecting at the given user's location a particular program from said program data stream without off location contact using the listing,
  recording said selected program in a random access capable multiple program data storage media with another program at the given user's location,
  the accessible program having frequency related information with a certain intended length of presentation for a user requiring a second and different length of presentation,
  selectively decompressing said selected program for displaying, said displaying which can include display of the program including said at least some substantive displayable information,
  and means to alter the frequency of the frequency related information to automatically compensate for the different length of presentation.

87. I claim the method of claim 86 characterized in that program identification data is also delivered for those programs delivered without a given user's request,
  the multiple programs and program identification data being delivered substantially contemporaneously and by the addition of delaying the programs to allow processing of the program identification data.

88. I claim the method of claim 87 characterized by the addition of processing the program identification data by a data manager means.

89. I claim an access method having a storage area for multiple television programs having substantive displayable information, the programs subject to access, storage, and/or retrieval at a user location by a listing,
  the improvement including:
  recording at least part of two multiple programs having substantive displayable information in the random access capable multiple program storage area at the user location,
  accessing at least part of a given program having substantive displayable information from the multiple program storage area so as to select reproduction thereof,
  recording programs having substantive displayable information at the same time as said reproduction which recording can include the remainder of said given program and/or another program in the storage area,
  a decompression circuit, a frequency artifact producing circuit, and a frequency artifact modifier circuit,
  means to pass the programs through the decompression circuit and through said frequency artifact modifier circuit, and means to selectively bypass the frequency artifact modifier circuit when the frequency artifact producing circuit is inactive.

90. I claim an access method having a decompression circuit and a frequency artifact producing circuit,
  the improvement of storing at least two multiple programs in a program material storage area at a user location, passing a program through the decompression circuit and then passing it through a frequency artifact modifier circuit,
  and selectively bypassing the frequency artifact modifier circuit when the frequency artifact producing circuit is inactive.

91. I claim the access method of claim 90 characterized in that the decompression decoder is a MPEG decoder.

92. I claim the access method of claim 90 characterized in that the artifact modifier circuit is a frequency converter.

93. I claim an access method having multiple channels of substantive displayable information and access information for delivery of multiple television programs to a remote location,
  the method including:
  a data manager,
  storing the access information relative to the delivered information including information relative to at least one delivered upcoming program in the memory of a data manager located at said remote location,
  and selectively controlling access to the substantive displayable information on the multiple channels for presentation of said programs which can include the display of said at least one delivered upcoming program at said remote location using said data manager and the recording of at least two of the multiple programs in a random access capable program data storage at the remote locations the accessible program having frequency related information with a certain intended first speed of presentation,
and means to alter the frequency of the frequency related information to compensate for a different speed of presentation.

94. I claim the access method of claim 93 characterized by the addition of storing the channels of information.

95. I claim the access method of claim 93 characterized by the addition of program information relative to the multiple channels of information and utilizing such program information in the data manager.

96. I claim the access method of claim 93 characterized by the addition of other services and accessing said other services by said data manager.

97. I claim an improved access method for a particular user to access multiple television programs delivered in compressed form via one or more delivery channels,
   at least one of said multiple programs including at least some substantive displayable information,
   said access method including delivery program information separate from said substantive displayable information to the particular user at the given location,
   recording at least two of the multiple programs in a compressed format in a random access capable data storage medium at the given location,
   accessing by the particular user at the given location said program information and selecting a particular program for presentation at the given location,
   the accessible program having frequency related information with a certain intended run time of presentation at a first speed,
   decompressing said particular program for display which can include the display of said at least some substantive displayable information,
   and means to alter the frequency of the frequency related information to compensate for a different run time of presentation.

98. I claim the access method of claim 97 characterized by the addition of allowing the user to access the program through the data manager means.

99. I claim a method having multiple programs transmitted in a compressed form via a transmission media with program identification data transmitted to a particular user at a given location,
   at least one of the programs including at least some substantive displayable information that may be other than the program identification data,
   the method including the particular user directly accessing the program identification data at the given location,
   delaying the programs to allow processing of the program identification data, processing the program identification data at the given location,
   and processing the program identification data and allowing the particular user to selectively access the programs at the given location by a data manager means at the given location, which access can include displaying said at least some substantive displayable information and the recording of at least two of the multiple programs in a random access capable program data storage at the given location,
   the accessible program having frequency related information with a certain intended run time of presentation at a certain frequency,
   and means to alter the frequency of the frequency related information to compensate for a different run time of presentation.

100. I claim an improved method for a multiplicity of television programs transmitted in a compressed form on one or more transmission channels,
   listing the programs to allow the access, storage, and/or retrieval thereof also being transmitted,
   characterized by the addition including:
   storing at least two of said multiplicity of programs in their compressed form in a random access capable program data storage at a given location,
   at least one of said multiplicity of programs including at least some substantive displayable information,
   said storing the programs including an optical storage medium which storage can include said at least some substantive displayable information,
   selectively accessing a program using the listing and decompressing the program from said means to store at least two of said multiplicity of programs in the program data storage at said given location for display,
   the accessible program having frequency related information with a certain intended first run time of presentation,
   and means to alter the frequency of the frequency related information.

101. I claim the access method of claim 100 characterized in that the programs are compressed in MPEG and selectively decompressing said MPEG signals.

102. I claim the access method of claim 100 characterized in that there are a number of sets of multiplicity programs that are selectively stored.

103. I claim an improved access method for substantive displayable television programs delivered via one or more delivery channels to a particular location,
   listing the programs allowing the access, storage, and/or retrieval thereof also delivered,
   said access method including:
   recording at least two selected ones of the multiple delivered programs in a random access capable program data storage at the particular location,
   selectively retrieving a selected one of the delivered program from said multiple program data storage using the listing by a user control,
   simultaneously recording other selected portions of the delivered program in said program data storage as said selected portion of a substantive displayable program is being selectively retrieved by said user control,
   a circuit producing a frequency artifact, a frequency artifact modifier circuit,
   and means to sass the programs through said circuit producing a frequency artifact and then through said frequency artifact modified circuit.

104. I claim the access method of claim 103 characterized in that said selected portion and at least one of said other selected portions are from the same program.

105. I claim the access method of claim 103 characterized in that said selected portion and at least on of said other selected portions are from different programs.

106. I claim an improved access method for substantive displayable television programs delivered via one or more delivery channels to a particular location,
   a listing the programs allowing the access, storage, and/or retrieval thereof also delivered,
   said access method including:
   recording at least two selected ones of the multiple delivered programs in a random access capable program data storage at the particular location, said selected portion and at least one of said other selected portions being from the same program, selectively retrieving a selected one of the delivered program from said multiple program data storage using the listing by a user control, simultaneously recording other selected portions of the delivered programs in said program data storage as said selected portion of a substantive displayable program is being selectively retrieved by said user control, the program of which said selected portion is a part having a normal presentation conclusion time from initial retrieval, and characterized in that the retrieving said selected portion can be selectively interrupted by the user for a period, any retrieving of said selected portion can be accelerated to compensate for said period, and said acceleration allowing the program to end at the normal presentation conclusion time.

107. I claim the access method of claim 106 wherein the program has a frequency and characterized by altering the frequency of any accelerated portion to be substantially equal to the frequency of the program.

108. I claim an improved access method for multiple television programs transmitted via one or more transmission channels, and a listing of the programs allowing the access, storage, and/or retrieval thereof, said access method including:

passing a data stream via a delivery channel for recording in a data manager located at a particular user's given location, accessing the data in said data manager using the listing of programs, recording at least two of the multiple programs transmitted on the transmission channel without any active selection by the user in a random access capable multiple program data storage at said particular user's given location, at least one of said programs including at least some substantive displayable information, retrieving selected portions of the programs in said multiple program data storage at said given location via the listing thereof in said data manager, which retrieval can include the display of said at least some substantive displayable information, the accessible program having frequency related information with a certain intended run time of presentation at a first speed for a user requiring a different run time of presentation at a second speed, and means to alter the frequency of the frequency related information to automatically compensate for the different run time of presentation and thus the certain run time of presentation of the accessible program to the different run time.

109. I claim the access method of claim 108 characterized in that said data stream includes information of upcoming substantive programs.

110. I claim the access method of claim 108 characterized by selectively programming said user control to automatically record programs in said program data storage based on the data in said data manager.

111. I claim the access method of claim 108 characterized by transmitting substantially all of the programs transmitted on a transmission channel without any user's control.

112. I claim the access method of claim 111 characterized in that the programs are substantially continually transmitted.

113. I claim the access method of claim 108 characterized in that said program data storage can record programs and the user retrieving a program from said program data storage at the same time.

114. I claim an improved access method for multiple television programs transmitted via one or more transmission channels, and a listing of the programs allowing the access, storage, and/or retrieval thereof, said access method including:

passing a data stream via a delivery channel for recording in a data manager located at a particular user's given location, accessing the data in said data manager using the listing of programs, recording at least of the multiple programs transmitted on the transmission channel without any active selection by the user in a random access capable multiple program data storage at said particular user's given location, at least one of said programs including at least some substantive displayable information, retrieving selected portions of the programs in said multiple program data storage at said given location via the listing thereof in said data manager, which retrieval can include the display of said at least some substantive displayable information, the program of which said selected portion is a part having a normal presentation conclusion time from initial retrieval, the retrieving of said selected portion having the capability of being selectively suspended by the user for a period of time, automatically accelerating any retrieving of said selected portion to compensate for said period of time, and said accelerating allowing the program to end at the normal presentation conclusion time.

115. I claim the access method of claim 114 wherein the program has an original frequency and characterized by altering the frequency of any accelerated portion by a frequency shift means to be substantially equal to the original frequency of the program.

116. I claim an improved access method for multiple programs transmitted on one or more transmission channels, said access system including:

passing a data stream via a delivery channel for access at the direction of a data manager located at a particular user's given location, allowing access to the data in said data manager by a user control, recording at least two of the multiple programs transmitted on the transmission channel in a random access capable multiple program data storage without any active selection of individual ones of the specific programs by the user at said given location, at least one of said multiple programs including at least some substantive displayable information other than listing data, automatically recording selected portions of the transmitted programs in said multiple program data storage at said given location using the listing data in said data manager, which recording can include said at least some substantive displayable information, a decompression circuit,d a frequency artifact producing circuit, and a frequency artifact modifier circuit, means to pass the programs through the decompression circuit, the frequency artifact producing circuit, and said frequency artifact modifier circuit, and means to selectively bypass the frequency artifact modifier circuit when the frequency artifact producing circuit is inactive.

117. I claim the access method of claim 116 characterized by programming said selection to discard programs recorded in said program data storage including programs not yet retrieved according to a known set of priorities.

118. I claim the access method of claim 117 characterized in that said known set of priorities includes the available recording room in said program data storage.

119. I claim the access method of claim 117 characterized in that said known set of priorities are ranked in an order of preference.

120. I claim the access method of claim 116 characterized in that said known set of priorities may be changed from time to time.

121. I claim the access method of claim 115 characterized by programming said select means to record transmitted programs in said program data storage according to a selection algorithm.

122. I claim the access method of claim 120 characterized in that said selection algorithm includes one or more of consideration of the desirability of the program to the user, the number of users for a program, the time of the program, the relation of the program to programs previously stored, the content of the program, the particular channel for the program and/or the availability of removable storage.

123. I claim the access method of claim 121 characterized in that said selecting discards or records over previously recorded programs in said program data storage including not retrieved programs according to a known set of priorities.

124. I claim the access method of claim 123 characterized in that said known set of priorities includes the available recording room in said program data storage.

125. I claim the access method of claim 123 characterized in that said known set of priorities are ranked in an order of preference.

126. I claim the access method of claim 123 characterized in that said known set of priorities may be changed from time to time.

* * * * *